(12) United States Patent
Hareuveni et al.

(10) Patent No.: US 11,234,254 B2
(45) Date of Patent: Jan. 25, 2022

(54) NETWORK COMPONENT, SYSTEM AND METHOD

(71) Applicant: Intel Corporation, Santa Clara, CA (US)

(72) Inventors: Ofer Hareuveni, Haifa (IL); Rony Ross, Haifa (IL); Daniel Bravo, Portland, OR (US); Ehud Reshef, Kiryat Tivon (IL); Laurent Cariou, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 34 days.

(21) Appl. No.: 16/726,972

(22) Filed: Dec. 26, 2019

(65) Prior Publication Data

US 2021/0204302 A1 Jul. 1, 2021

(51) Int. Cl.
*H04W 72/12* (2009.01)
*H04L 1/00* (2006.01)
(Continued)

(52) U.S. Cl.
CPC ......... *H04W 72/121* (2013.01); *H04L 1/0026* (2013.01); *H04L 67/104* (2013.01);
(Continued)

(58) Field of Classification Search
CPC ..... H04W 16/14; H04W 88/04; H04W 16/26; H04W 24/00; H04W 24/10;
(Continued)

(56) References Cited

U.S. PATENT DOCUMENTS

| | | | |
|---|---|---|---|
| 2014/0126461 A1* | 5/2014 | Ghosh | H04W 16/14 370/315 |
| 2015/0327328 A1* | 11/2015 | Novak | H04W 88/04 455/11.1 |
| 2018/0242373 A1* | 8/2018 | Wang | H04W 74/0891 |

OTHER PUBLICATIONS

IEEE Standards Association, "IEEE Standard for Information Technology—Telecommunications and Information Exchange between Systems Local and Metropolitan Area Networks—Specific Requirements—Part 11: Wireless LAN Medium Access Control (MAC) and Physical Layer (PHY) Specifications", IEEE Std 802—2016 (Revision of IEEE Std 802.11-2012), 3534 pages (divided into 3 documents: part 1, part 2 and part 3; uploaded separately), Dec. 2016, IEEE, New York, USA.

(Continued)

*Primary Examiner* — Phuc H Tran
(74) *Attorney, Agent, or Firm* — Viering, Jentschura & Partner mbB

(57) ABSTRACT

According to various aspects, a network component may include: one or more processors configured to: generate a first message to a wireless network client, the first message including a request to report information about wireless networks within communication range of the wireless network client; assign a scheduling group of a plurality of scheduling groups to the wireless network client based on the information; schedule one or more transmissions in accordance with a first wireless network protocol to the wireless network client in accordance with the schedule group assigned to the wireless network client; generate a second message to the wireless network client, the second message including an instruction to schedule one or more transmissions in accordance with a second wireless network protocol from the wireless network client in accordance with the schedule group assigned to the wireless network client.

20 Claims, 15 Drawing Sheets

(51) Int. Cl.
   *H04L 29/08* (2006.01)
   *H04W 72/04* (2009.01)
   *H04W 72/08* (2009.01)

(52) U.S. Cl.
   CPC ..... *H04W 72/0453* (2013.01); *H04W 72/082* (2013.01); *H04W 72/1252* (2013.01); *H04W 72/1289* (2013.01)

(58) Field of Classification Search
   CPC ......... H04W 28/0231; H04W 28/0252; H04W 36/06; H04W 52/244; H04W 72/04; H04W 72/0446; H04W 72/085; H04W 72/1289; H04W 74/002; H04W 74/004; H04W 74/0875; H04W 74/0891; H04W 84/12; H04W 84/18; H04B 7/26; H04L 1/1671
   See application file for complete search history.

(56) References Cited

OTHER PUBLICATIONS

Extended European Search Report issued for the European Patent Application No. 20195917.8, dated Feb. 19, 2021, 16 pages (for informational purposes only).

\* cited by examiner

FIG. 4
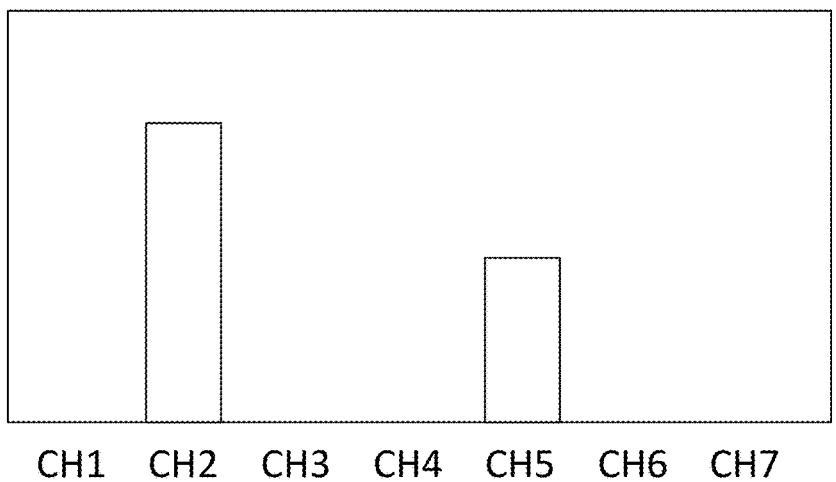
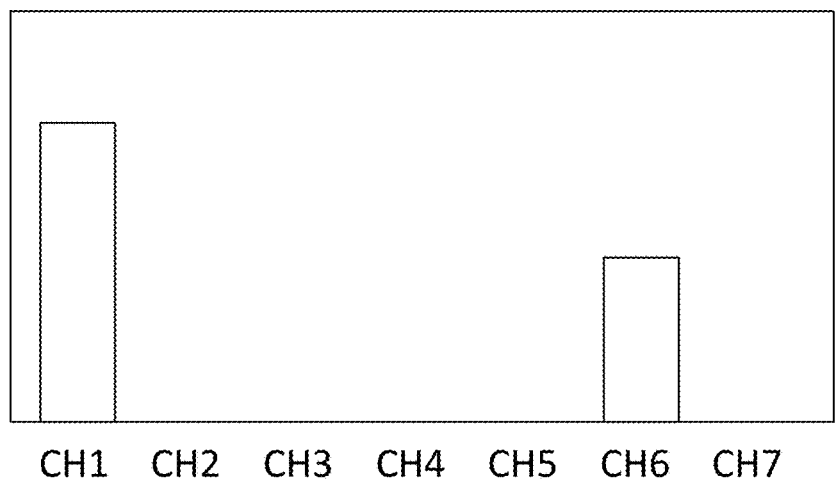

|       | 216a | 216b | 216c | 216d | 216e | 216f |
|-------|------|------|------|------|------|------|
| 216a  |      | 10   | 2    | 7    | 3    | 0    |
| 216b  |      |      | 8    | 4    | 3    | 4    |
| 216c  |      |      |      | 0    | 2    | 4    |
| 216d  |      |      |      |      | 9    | 2    |
| 216e  |      |      |      |      |      | 6    |
| 216f  |      |      |      |      |      |      |

NETWORK COMPONENT, SYSTEM AND METHOD

TECHNICAL FIELD

Various aspects relate generally to a network component, a system, and a method.

BACKGROUND

When a high density of wireless networks are deployed within a given area (e.g., an enterprise environment and due to limitations resulting from available spectrum), wireless communication performance may suffer. The resultant interference may, for example, reduce the transmission rate for one or more of the wireless networks, and potentially reduce the work efficiency of users in enterprise use cases. As peer-to-peer (P2P) wireless docking between peripheral devices and mobile work stations, such as laptops, becomes more prevalent, it is likely that the density of wireless networks will increase. Currently, there is no robust solution available for wireless docking in enterprise, experiencing interference from neighboring P2P activities. For example, IEEE 802.11 does not support Communication Collaborative Network (CCN) or massive MIMO (Multiple Input Multiple Output) networks, and in particular resource allocation signaling for hierarchic networks. At present, an access point (AP) is capable of solely controlling traffic to/from clients of the AP (it directly connects to).

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 4 shows exemplary information about wireless networks in various diagrams according to various aspects;

DESCRIPTION

Figure 1:
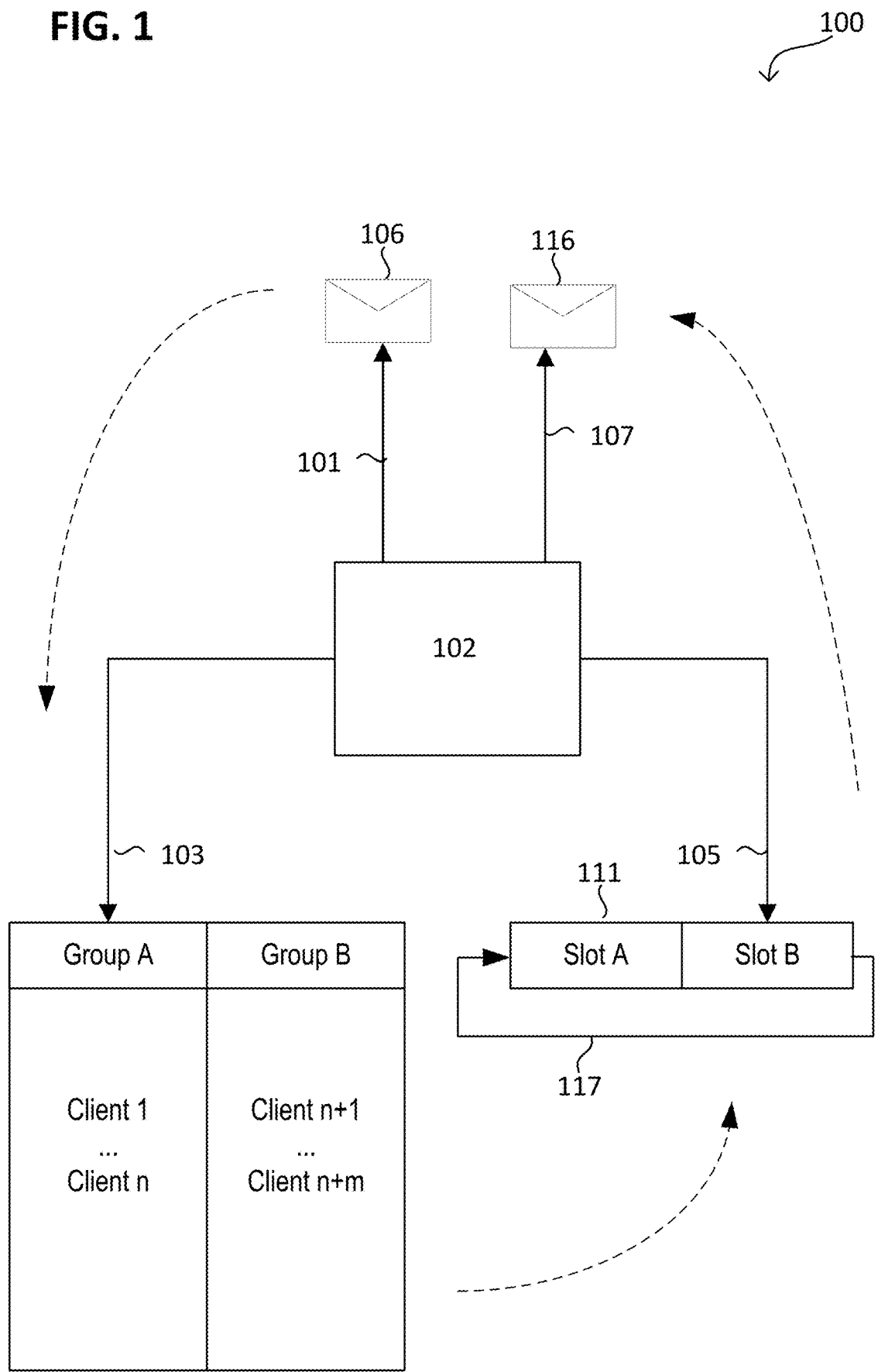
FIG. 1 shows an exemplary network component in a method in a schematic flow diagram according to various aspects.

The following detailed description refers to the accompanying drawings that show, by way of illustration, specific details and aspects in which the disclosure may be practiced. One or more aspects are described in sufficient detail to enable those skilled in the art to practice the disclosure. Other aspects may be utilized and structural, logical, and electrical changes may be made without departing from the scope of the disclosure. The various aspects described herein are not necessarily mutually exclusive, as some aspects can be combined with one or more other aspects to form new aspects. Various aspects are described in connection with methods and various aspects are described in connection with devices and vice versa. However, it may be understood that aspects described in connection with methods may similarly apply to the devices, and vice versa. Throughout the drawings, it should be noted that like reference numbers are used to depict the same or similar elements, features, and structures.

The following describes various steps and details of a method. It can be understood that the described (e.g. individual steps of the method) can be implemented in analogy by means of hardware (e.g. a hard-wired circuit) and/or software (e.g. code segments or an entire application) and vice versa. For example, an application (also referred to as a "program") may be or be provided which has corresponding code segments (e.g. program code). The code segments may be executed on a processor and/or by means of a circuit which has the processor. For example, the processor (or circuit) may be part of a network device or computing device. For example, the device may have a plurality of processors that are centrally located within a physically interconnected network, or decentrally interconnected by a network (such as wireless or wired). In the same way, code segments or the application can be executed on the same processor or parts of it can be distributed among several processors that communicate with each other via the network (e.g. wireless or wired). Any other kind of implementation of the respective functions, which will be described in more detail below, may also be understood as provided by a one or more processors, e.g. of a controller.

The word "exemplary" is used herein to mean "serving as an example, instance, or illustration". Any example or design described herein as "exemplary" is not necessarily to be construed as preferred or advantageous over other examples or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

The term "processor" as, for example, used herein may be understood as any kind of entity that allows handling data, signals, as examples. The data, signals, as example, may be handled according to one or more specific functions executed by the processor.

A processor may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), as examples, or any combination thereof. Any other kind of implementation of the respective functions, which will be described below in further detail, may also be understood as a processor or logic circuit. It is understood that any two (or more) of the processors or logic circuits detailed herein may be realized as a single entity with equivalent functionality, and conversely that any single processor or logic circuit detailed herein may be realized as two (or more) separate entities with equivalent functionality. It is understood that one or more of the method steps detailed herein may be performed (e.g., realized) by a processor, may by one or more specific functions executed by the processor.

The term "system" detailed herein may be understood as a set of interacting elements, the elements may be, by way of example and not of limitation, one or more physical components (e.g., processors, transmitters and/or receivers) and/or one or more digital components (e.g., code segments, instructions, protocols). Generally, the system may include one or more functions to be operated (also referred to as "operating functions") of which each may be controlled for operating the whole system.

A processor may be configured, e.g., by the code segments (e.g., software), to control the operation of a system (e.g., its operating sequence or the like), e.g., a network or parts thereof, e.g., at least one transmission via the network. Thereby, the processor may implement a controller (e.g., a scheduling controller, e.g., provided as a network component). The controller (e.g., the network component) may optionally include a memory, e.g., storing code segments that represent the processes that the controller provides, e.g., the controlling of the one or more operating functions. Additionally or alternatively, the memory may store one or more models, criterion, rules, and algorithms, as examples, as detailed herein. It is understood that any two (or more) of the controllers detailed herein may be realized as a single controller with substantially equivalent functionality, and conversely that any single controller detailed herein may be realized as two (or more) separate controller with substantially equivalent functionality. Additionally, references to a "controller" may refer to two or more controllers that collectively form a single controller.

As used herein, "memory" (also referred to as "storage") may be understood as a non-transitory computer-readable medium in which data or information can be stored for retrieval. References to "memory" or "storage" included herein may thus be understood as referring to volatile or non-volatile memory, including certain types of random access memory ("RAM"), read-only memory ("ROM"), flash memory, solid-state storage, magnetic tape, hard disk drive, optical drive, as examples, or any combination thereof. Furthermore, it is appreciated that registers, shift registers, processor registers, data buffers, as examples, are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "software" refers to any type of executable instruction, including firmware.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples.

According to various aspects, the term "coupled" or "coupling" can be understood in the sense of a (e.g. communicative and/or electrical), e.g. direct or indirect, connection and/or interaction. For example, several elements can be coupled together along a communicative chain, along which a communication (e.g. data) can be transmitted, e.g., exchanged. For example, two coupled entities may exchange data with each other, e.g. to transmit information. An entity (for example, a network component, a client or network device) that is coupled (e.g., attached) to or by a network may be registered by the network and/or may be addressable by the network, e.g., using one or more radio communication technologies. The entity may have a media access control address (MAC address) assigned to a network interface controller (NIC) for use as a network address in communications within the network. A physical network entity refers to an electronic device that is attached to a network, and is capable of creating, receiving, or transmitting information over a communications channel used by the network, e.g., scheduled by the network component.

In some aspects, a network component may be implemented in various layers of the Open Systems Interconnection (OSI) reference model, including the physical layer, the data link layer, and/or the network layer of the network, and may be implemented in hardware, e.g. a device, such as a network-compatible device (e.g., an access point), software, or a combination of hardware and software. An access point (AP) may, for example, include a networking hardware device configured to permit one or more other wireless network devices to connect to a wired network. The AP may be configured to connect to a router (e.g., via a wired/wireless network) as a standalone device, but may alternatively be an integral component of the router itself.

In the context of a BSS-network (Basic Service Set network, e.g., provided as a Base Station Subsystem network), the AP refers to the base station and a wireless network client (also referred to as a "client") refers to client station of the BSS-network. The term "basic service sets (BSS)" refers to a subgroup of devices within a service set, which are operating with the same physical layer medium access characteristics (i.e. radio frequency, modulation scheme, security settings etc.) such that they are wirelessly networked. Devices within basic service sets are identified by BSSIDs (basic service set identifiers).

Set up in infrastructure-mode, the wireless network basic service set (BSS) may include of one redistribution point (also referred to as WAP or AP) and one or more client stations (also referred to as client) that are associated with (i.e. connected to) that redistribution point. In the example of IEEE802.11, both types of stations that are capable of using the IEEE802.11 protocol are also referred to as STA. The AP may, for example, be provided by a STA that provides access to the distribution services. In this context, and the one or more client stations (e.g., e.g., other stations and/or User Equipment) are referred as "Non-AP-STA". In WFA (Wi-Fi Alliance) terminology, a one or more types of Non-AP-STA may be capable of providing its own WPAN service, but are referred as Non-AP-STA-CFON (not AP) to reflect the hierarchy of the networks.

The stations in BSS that is set up in an "ad-hoc-mode" communicate directly with one another, i.e. without a dependence on or necessity of a distribution point to relay traffic between them. In this form of peer-to-peer wireless networking, the peers form an independent basic service set (MSS). One or more of the functions that are provided by the one or more distribution points in the infrastructure-mode, such as defining network parameters and other beaconing functions, are provided by a "first" station (e.g., the owner) in the ad-hoc-mode. In contrast to the infrastructure-mode, the "first" station does not relay traffic between the other stations in ad-hoc-mode. Instead, in the peers in ad-hoc-mode communicate directly with one another in the ad-hoc-mode.

For example, the client may be configured to (e.g., only) communicate with or through the base of the BSS-network. A client (also referred to as Non-AP-STA) may, for example, be implemented by any physical wireless network-compatible device (also referred to as a "network device"), e.g., including software implementing a virtual network device, or the like. A network device may include one or more mobile devices and/or one or more stationary device. Examples of a mobile device include a mobile phone, e.g. a feature phone or a smartphone, a radio message receiver, a tablet, a laptop, a smartwatch, any mixed form of these device types, among others. Other examples of a network device also include wireless headphones, a wireless dock, a wireless speaker, or other devices, which are capable of coupling to a wireless network.

Examples of a network described herein may, for example, include a local area network (LAN), a wireless LAN (WLAN), or a personal area network (PAN), such as a wireless PAN (WPAN), such as a Bluetooth network, or a nonlocal network (such as a Metropolitan Area Network (MAN), a Wide Area Network (WAN), or a Global Area Network (GAN). Differentiated by transmission type, examples of a network may include a radio network (also referred to as a "wireless network"), a wired network, or some combination thereof (e.g., hybrid network). For example, the wireless network may include or be formed from of a cellular radio network (e.g. an IEEE 802.11, a Bluetooth network, or another mobile radio network.

Further examples of a wireless network may include: Ultra Wide Band (UWB) network, and/or a Wireless Local Area Network (WLAN). The WLAN may be provided in accordance with Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), HiperLAN/2 ((High Performance Radio LAN; an alternative ATM-like 5 GHz standardized technology), Vehicle-to-Vehicle (V2V) and Vehicle-to-X (V2X) and Vehicle-to-Infrastructure (V2I) and Infrastructure-to-Vehicle (I2V) communication technologies. Examples of the IEEE 802.11 radio communication standard (also referred to as "IEEE802.11") may include IEEE802.11b, IEEE802.11b, IEEE802.11n (Wi-Fi 4), IEEE802.11ac (Wi-Fi 5), IEEE802.11ax (Wi-Fi 6), IEEE802.11a (5 GHz), IEEE802.11g (2.4 GHz), DSRC (Dedicated Short Range Communications) communication arrangements such as Intelligent-Transport-Systems, and other existing, developing, or future radio communication technologies. As used herein, a first network (e.g., in accordance with a first radio communication technology) may be different from a second network (e.g., in accordance with a second radio communication technology), e.g., if the first and second radio communication technologies are based on different communication standards and/or their underlying network protocols (NPs) differ from each other.

Various aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), IMT-2020 spectrum (expected to include 3600-3800 MHz, 3.5 GHz bands, 700 MHz bands, bands within the 24.25-86 GHz range, unlicensed spectrum ranges 2.4-2.5 GHzs, 5-6 GHz, 6-7 GHz, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, some aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources. Furthermore, aspects described herein may also use radio communication technologies with "AFC" (Automatic Frequency Coordination), e.g., for U-NII-5 or 7 (Unlicensed National Information Infrastructure 5 or 7).

Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals. The physical transmission and reception may be handled by radio-layer components such as RF (radio frequency) transceivers and antennas. The logical transmission and reception may be handled over the software-level connection, e.g., performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

According to various aspects, the transmission of information (also referred to as "information transmission" or simply "transmission" in at least one aspect) may be provided in accordance with one or more network protocols (NPs), e.g., a protocol in accordance with the radio communication technology of the network used for the transmission. The transmission may, for example, include generating and/or transmitting a message including the information according to the NP. The NP can designate an agreement, under which the transmission is conducted between two or more entities coupled to the network. In its simplest form, the NP can be defined as a set of rules that define the syntax, semantics and/or synchronization of transmission. The network protocol(s) used (e.g. one or more wireless network protocols) can be selected according to the requirements and can (but do not have to) be configured according to the OSI (Open System Interconnect) reference model. Any protocol can also be used in the respective protocol layers. For example, the NP can be used according to a Bluetooth protocol or another radio-based communication protocol. For example, the transmission of information via Bluetooth may include generating and/or transmitting a message containing the information according to a Bluetooth protocol stack. The Bluetooth protocol stacks can optionally be set up according to a low-energy communication protocol stack (low-energy protocol stack), e.g., the information can be transmitted via low-energy Bluetooth. For example, the transmission of information via WLAN may include generating and/or transmitting a message including the information according to a WLAN protocol stack.

In general, a message generated in accordance with a NP may be sent and/or transmitted to a recipient (e.g., as specified by the message), to which the message is addressed and/or intermediary of the recipient.

Various aspects are related to a hierarchical network architecture including at least two discrete networks. A hierarchical network architecture involves a division into discrete hierarchic layers, each of which including one or more networks. Each layer, or tier, in the hierarchy provides specific functions that define its role within the overall communicative chain. In general, a hierarchical network architecture may, for example, be used in a communication system to transmit data to one or more clients of the respective network, e.g. to one or more devices that are coupled with one of the networks. As used herein, the client may, in some aspects, implement a node that is connected to at least two discrete hierarchic layers of the hierarchical network architecture.

Further, a scheduling (e.g., according to a scheduling scheme) of transmissions may be applied to each of the networks. Due to the scheduling, transmission(s) of one or more clients of the same schedule group (e.g., schedule group A) may occur within the same time slot (e.g., time slot A). Clients of different schedule groups (e.g., schedule group A as opposed to schedule group B) may be configured to transmit within different time slots (e.g., time slots A and B, respectively). This type of scheduling may reduce interference among transmissions. According to various aspects, one or more scheduling groups may be assigned to each client. In the following, reference is made to one of the one or more scheduling groups for demonstrative purposes, and is not intended to be limiting. The references made to the scheduling group may analogously apply to a multiple of scheduling groups assigned to a client.

According to various aspects, the network component may be configured to control the scheduling of transmissions within one of the hierarchic layers (e.g., networks) of the hierarchical network architecture. Further, the network component may, for example, be configured to instruct the client to adapt one or more of its transmissions through another of the layers (e.g., networks) of the hierarchical network architecture. As such, scheduling information may be provided through one of the clients that couples both discrete hierarchic layers (e.g., networks) of the hierarchical network architecture with each other (e.g., as a node).

According to various aspects, an optimization of spatial and spectral reuse of multiple short range peer-to-peer-networks (P2P-networks) and infrastructure networks is provided, enabling high density wireless docking in enterprise. According to various aspects, existing IEEE 802.11 protocols may be used to trigger measurements, collect spatial data, and/or control P2P-network parameters and time allocation with minimal air capacity overhead. The provided mechanism may be scalable to a multi-AP environment. Flows and awareness of interference mapping and optimization of overall throughput latency and/or jitter in environment having multiple schedule-able short-range P2P-networks are provided, e.g., having flows and grouping processes.

According to various aspects, a network component configured as described herein may be sniffed to detect that it controls a P2P-network, to which a client is coupled to.

In the following, reference is made to certain aspects of networks, their protocols, and messages transmitted via network(s). In an exemplary embodiment of the same, an implementation in accordance with IEEE 802.11ax, Revision A and B may be used. Also future IEEE 802.11 may be used for implementation, e.g., that may add further P2P triggered capabilities.

FIG. 1 illustrates an exemplary network component 100 in a method in a schematic flow diagram according to various aspects. The network component 100 may include one or more processors 102 that are configured to perform the method (e.g., in a sequence as illustrated by the dashed arrows), e.g., multiple times. The method may include, generating 101 a first message 106 (also referred to as "request message" 106) for a wireless network client. The request message 106 may include a request (e.g., for the wireless network client) to report information about wireless networks within communication range of the wireless network client (also referred to as "requested client"). The request message 106 may be transmitted to the requested client via a communicative connection between the requested client and the network component 100, e.g., via a first wireless network, e.g., in accordance with the NP of the first wireless network.

The method may further include, assigning 103 a scheduling group (e.g., schedule group A or schedule group B) of a plurality of scheduling groups to the wireless network client based on the information (also referred to as grouping 103). The plurality of scheduling groups may include more than 2, e.g., 3 or more, e.g., 4 or more, e.g., 5 or more, e.g., 10 or more, e.g., 20 or more, e.g., 30 or more, e.g., 50 or more, e.g., 100 or more, schedule groups. The number of clients (here exemplary denoted as n and m) assigned to each of the schedule groups may be one or more, e.g., 2 or more, e.g., 3 or more, e.g., 4 or more, e.g., 5 or more, e.g., 10 or more, e.g., 20 or more, e.g., 30 or more, e.g., 50 or more, e.g., 100 or more. Each of the clients that are grouped 103 may, for example, be communicatively coupled with the first wireless network (e.g., to its BSSID).

The method may further include, scheduling 105 (also referred to as the process of generating a schedule) one or more transmissions in accordance with the first wireless NP (e.g., a protocol in accordance with the first wireless network) to the wireless network client in accordance with the schedule group assigned to the wireless network client. The first wireless network may be part of or form the communicative connection between each of the clients (e.g., the requested client) and the network component 100. The first wireless network may, for example, be implemented as a network in accordance with IEEE 802.11, e.g., in infrastructure mode, or another wireless BSS-network.

Scheduling 105 may include allocating at least one time slot of a transmission period 111 to each of the schedule groups of the plurality of scheduling groups. Referring to IEEE 802.11, a time slot may refer to the transmit opportunity (TxOP) allocated to the schedule group and its members, e.g., client(s) and/or other network device(s). The time slot may define the amount of time that the schedule group and its members are allowed to transmit frames to the network component 100 and/or to each other (illustratively, a transmission right) using the first wireless network.

According to various aspects, the transmission period 111 may be divided into time slots according to grouping. For example, the number of time slots of the transmission period 111 may be equal to (or greater than) the number of schedule groups of the plurality of schedule groups.

The transmission period 111 may be repeated 117, e.g., continuously and/or in a loop. That is, that the requested client may be configured to communicate (e.g., transmit one or more messages) via the first wireless network (e.g., only) within the time slot (also referred to as slot) as allocated to the schedule group of the plurality of scheduling groups, which is assigned to the requested client. Analogously, each of the clients that are grouped 103 may configured to communicate (e.g., transmit one or more messages) via the first wireless network (e.g., only) within the time slot as allocated to the schedule group of the plurality of scheduling groups, which is assigned to the respective client.

In this example, time slot A (also referred to as "slot A") is allocated to schedule group A, and time slot B (also referred to as "slot B") is allocated to schedule group B. Thus, each of the clients assigned to schedule group A may be configured to communicate (e.g., transmit one or more messages) via the first wireless network (e.g., only) within slot A. Analogously, each of the clients assigned to schedule group B may be configured to communicate (e.g., transmit one or more messages) via the first wireless network (e.g., only) within slot B.

The method may further include, generating 107 a second message 116 (also referred to as "instruction message" 116) to the requested client, based on (e.g., in response to) the report being returned from the requested client. The instruction message 116 may include an instruction to schedule one or more transmissions in accordance with a second wireless network protocol (e.g., a protocol in accordance with the second wireless network) from the requested client in accordance with the schedule group assigned to the requested client. For example, each of the clients may be coupled to an individual second wireless network, which is scheduled based on the instruction message 116 sent to the respective client.

The second wireless network (or each second wireless network) may be separate (e.g., distinct) from the communicative connection between the one or more clients and the network component 100. The second wireless network (or each second wireless network) may be part of a hierarchic layer different to (e.g., below) the hierarchic layer that includes the first wireless network. The second wireless network may, for example, be implemented as a network in accordance with IEEE 802.11, e.g., in ad-hoc mode, a Bluetooth network or another network capable of providing a peer-to-peer (P2P) connection.

A P2P-device as network device 214a to 214f (e.g., a WLAN Direct device), may communicate by establishing a P2P-network-connection, analogues to a traditional WLAN infrastructure network. The device implementing the AP like functionality in the P2P-network-connection is referred to as the P2P Group Owner (P2P-GO), and a device acting as peer in the P2P-network-connection may be referred as P2P-client.

By way of illustrative example, the requested client may be referred to as client 1, which is, as result of the grouping, assigned to schedule group A. Client 1 may be instructed to communicate via the first and second wireless network within the slot A as allocated to schedule group A. As such, transmissions received by or sent from Client 1 via the first wireless network and/or via the second network may be conducted (e.g., only) within time slot A (illustratively, a network-to-network scheduling synchronization).

The first wireless network and the second wireless network may (but not necessarily have to) differ from each other in the underlying network radio communication technology. Additionally or alternatively, the first wireless network and the second wireless network may (but not necessarily have to) differ from each other in the network protocol (also referred to as first and second network protocol) underlying the respective transmissions via the first wireless network and the second wireless network.

In some aspects, the first wireless network may have a greater communication range (also referred to as network range) than the second wireless network. As a result, the first wireless network may, for example, overlap with more other networks than the second wireless network or each second wireless network. According to at least one aspect, the first wireless network may overlap with each second wireless network as detailed herein.

As used herein, the range of a wireless network (also referred to as communication range) may be understood as the maximum range, e.g., limited (e.g., only) by the attenuation of the wireless transmission (e.g., by radio waves) in air (e.g., along a line of sight). For example, the range may be increased by increasing the power and/or reducing the frequency used for a transmission, that is, the power and/or frequency of the radio waves are indicative of the network range. In contrast thereto, environmental parameters that may also impair a transmission, e.g., a radio blocking walls or interference, are not changing the (e.g., environment independent) maximum range.

In some aspects, the scheduling of the first wireless network may be under control of the network component 100. Based on the instruction message 116, the scheduling of the second wireless network may be under control of the network component 100. The client or each client may implement a negotiator for the scheduling of the second wireless network (to which the client is coupled) with the network component 100.

For example, the network component 100 may include or be part of an access point (AP). The AP may include a radio transmitter (Tx) and/or a radio receiver (Rx) for providing the first wireless network, e.g., as part of a transceiver. A transceiver may include one or more transmitters and one or more receivers. The AP may, as example, include a wired transmitter and/or wired receiver for providing a wired network. Optionally, the AP may transfer at least a part of the logical communication between the first wireless network and the wired network.

In some aspects, the network component 100 may include or be part of a base station controller (BSC) or another controller of first wireless network. According to at least one aspect, the network component 100 may include or be part of a companion scheduling device.

In an exemplary implementation, the network component 100 may be configured to perform the method for each of the one or more clients, e.g., for each client coupled to the first wireless network. Additionally or alternatively, the network component 100 may be configured to perform the method, when sending the request message 106 is initiated, or vice versa.

It may be understood that the rate (e.g., frequency) and/or number of times the method may be initiated for each of the one or more clients may be individualized or may be identical for at least two (e.g., each) of the one or more clients. Additionally or alternatively, the performance of the method may be triggered by an event (also referred to as trigger event), of which examples are given herein.

Illustratively, the network component 100 may, based on the instruction message 116, be configured to control the scheduling of the second wireless network via the client. The client may, in some aspects, function as an interface between the first wireless network and the second wireless network and may automatically adapt the scheduling according to the instruction message 116 to the second wireless network. For example, the scheduling of the first wireless network may be transferred to the second wireless network via the client (e.g., a network-to-network scheduling synchronization).

In some aspects, the network component 100 may be configured to instruct, via the instruction message 116, an allocation of one or more other network resources (e.g., additionally to the transmission time) of the second wireless network or each second wireless network, e.g., in an analogous manner as the scheduling. Examples of the one or more other network resources include a transmission rate, a transmission channel, modulation and coding scheme (MCS), among others.

Optionally, the network component 100 may be configured to negotiate the scheduling with the client, e.g., by exchanging a one or more negotiation messages after the instruction message 116. The one or more negotiation messages may be configured to implement a negotiation of the scheduling. Illustratively, the client may optionally participate in the scheduling of the first and second wireless networks.

In the following, reference is made to a network component 100 that is implemented by an AP 202 providing the first wireless network for demonstrative purposes. The references made to the access point (AP) 202 may analogously apply to another implementation of the network component 100 as well as analogously to a first wireless network provided by a plurality of access points 202 (e.g., providing for a mesh). In some aspects, one or more of the APs 202 may implement the network component 100. For example, a plurality of AP 202 may be configured to provide a wireless network mesh, wherein one or more of the APs 202 may be implemented by the network component 100.

Figure 2:
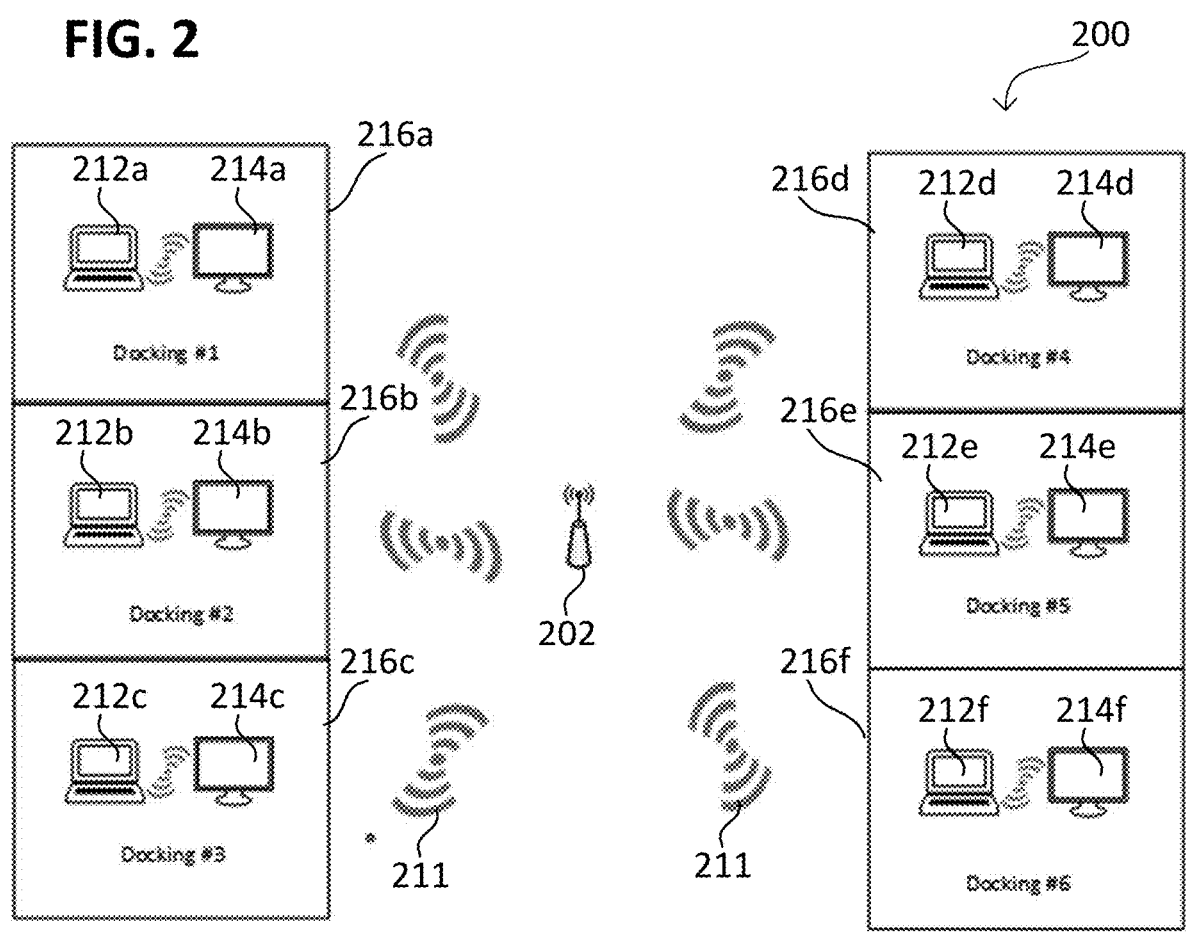
FIG. 2 shows an exemplary system in a schematic communication diagram according to various aspects.

FIG. 2 illustrates an exemplary system 200 in a schematic communication diagram according to various aspects. The system 200 includes one or more access points 202 (e.g., implemented by the network component 200) and includes one or more clients 212a to 212f.

For example, each of the one or more clients 212a to 212f may include a first radio transmitter (Tx) and/or a first radio receiver (Rx) configured to couple to the first wireless network. Further, each of the one or more clients 212a to 212f may include a second radio transmitter (Tx) and/or a second radio receiver (Rx) configured to couple to the second wireless network or providing the same.

In some aspects, first wireless network 211 may be implemented as a BSS-network (e.g., in accordance with IEEE 802.11 in infrastructure mode), and second wireless network 216a and 216f may be implemented as a peer-to-peer (P2P) network. The references made to the P2P-network 216a to 216f and the BSS-network may analogously apply to another configuration of the respective networks. For example, a WPAN may be another example for the second wireless network 216a to 216f.

A peer-to-peer network (P2P-network) may be understood as a distributed application architecture that partitions tasks or workloads between peers. Peers may, in some aspects, be equally privileged, equipotent participants in the application. Peers may be configured to form a peer-to-peer network of nodes. For example, in the P2P-network interconnected nodes ("peers") may share resources amongst each other without the use of a centralized administrative system.

Herein, one or more of clients 212a to 212f may be implemented by a device (e.g., a laptop) that is capable of docking to a respective network device 214a to 214f implemented by a device (e.g., a docking station, a docking station including a monitor) for demonstrative purposes. The references made to the laptop, and to the docking station may analogously apply to another configuration of the components of the system 200.

In the exemplary configuration as depicted in FIG. 2, the system 200 may include a plurality of P2P-pairs 216a to 216f (here exemplary referred to as docking #1 to docking #6). Each P2P-pair may include at least one of the one or more laptops 212a to 212f and least one docking station 214a to 214f, which are communicatively coupled to each other by one of the P2P-networks 216a to 216f. The P2P-pairs may differ from each other in their P2P-network, their laptop 212a to 212f and/or their docking station 214a to 214f.

For example, a first P2P-pair 212a, 214a, 216a may include a first laptop 212a and a first docking station 214a, which are communicatively coupled to each other by a first P2P-network 216a. Analogously, a second P2P-pair 212b, 214b, 216b may include a second laptop 212b and a second docking station 214b, which are communicatively coupled to each other by a second P2P-network 216b. Thus, the n-th P2P-pair may include a n-th laptop and the n-th docking station, which are communicatively coupled to each other by the n-th P2P-network. The number of P2P-pair "n" may, as example, be more than 2, e.g., more than 5, e.g., more than 10, e.g., more than 20, e.g., more than 50, e.g., more than 100.

It can be understood, that the configuration of the system 200 may be different from the illustrated embodiment (e.g., changing over time), e.g., having more or less clients 212a to 212f (e.g., per P2P-pair), more or less P2P-pairs, more or less P2P-networks 216a to 216f, and/or more or less network device 214a to 214f (e.g., per P2P-pair). For example, not all of the one or more clients 212a to 212f may necessarily be communicatively coupled to a network device 214a to 214f. The same applies to each network device 214a to 214f. For example, at least one of the one or more clients 212a to 212f may disconnect from or connect to a network device 214a to 214f or to the BSS-network 211 to change the configuration of the system 200.

As an example (e.g., for the trigger event), at least one of the one or more clients 212a to 212f may change the configuration of the system 200, e.g., by coupling to the BSS-network 211 and/or to the P2P-network 216a to 216f. As a further example (e.g., for the trigger event), at least one of the one or more clients 212a to 212f may change the configuration of the system 200, e.g., by decoupling from the BSS-network 211 and/or from the P2P-network 216a to 216f.

As another example (e.g., for the trigger event), at least one of the one or more network device 214a to 214f may change the configuration of the system 200, e.g., by decoupling (disconnecting) from the BSS-network 211 and/or from the P2P-network 216a to 216f. As a further example (e.g., for the trigger event), at least one of the one or more network device 214a to 214f may change the configuration of the system 200, e.g., by coupling to the BSS-network 211 and/or to the P2P-network 216a to 216f.

As yet another example (e.g., for the trigger event), at least one of the one or more P2P-pairs 216a to 216f may change the configuration of the system 200, e.g., by decoupling the client 212a to 212f of the P2P-pair 216a to 216f from the respective network device 214a to 214f (also referred to as "unpairing" or "undocking") of the P2P-pair 216a to 216f. As yet another example (e.g., for the trigger event), at least one of the one or more P2P-pairs 216a to 216f may change the configuration of the system 200, e.g., by coupling the client 212a to 212f to an uncoupled network device 214a to 214f (also referred to as "pairing" or "docking") via the P2P-network, thereby forming a P2P-pair 216a to 216f. Pairing may, for example, include a coupling request (e.g., as trigger event). Unpairing may, for example, include a decoupling request (e.g., as trigger event).

In more general, examples of the trigger event include a change of a communicative coupling (also referred to as coupling change) or a request to change the communicative coupling of the laptop. The request and/or the coupling change (e.g., by coupling or decoupling) may be in accordance with the BSS-network 211 and/or in accordance with the P2P-network 216a to 216f. For example, the coupling change may be between the laptop and the docking station or between the laptop and the AP 202. For example, the laptop may (e.g., automatically) report the coupling or the request to communicatively couple the monitor to the AP 202.

Reference was made to a docking station (also referred to as display) as network device 214a to 214f. In general, the network device 214a to 214f may be configured to communicate via the P2P-network 216a to 216f, e.g., including a transmitter that provides for the communication via the P2P-network 216a to 216f. More general examples of a network device 214a to 214f include a peripheral device, a mobile device, a smart device, gaming device, and the like.

Examples of a peripheral device include an input device (that provides the client an input function), such as a mouse, keyboard, graphics tablet, image scanner, barcode reader, game controller, light pen, light gun, microphone, digital camera, webcam, monitor, dance pad, read-only memory, among others. Other examples of a peripheral device include an output device (that provides the client an output function), such as a monitor, projector, printer, headphones, computer speaker, among others. Further examples of a peripheral device include an input/output device (that provides the client an input function and an output function), such as a computer, a data storage device (e.g., a disk drive, USB flash drive, memory card and tape drive and the like), a digital watch, a multifunctional keyboard, a head mounted display, a touch display, among others.

It may be understood that the role of the laptop and the docking station in the communicative chain may be reversed. That is, the docking station may be the client of the BSS-network 211 and peer of the P2P-network 216a to 216f, whereas the laptop may be configured to pair to the monitor via the P2P-network 216a to 216f (e.g., being only peer of the P2P-network 216a to 216f). Analogously, the docking station or the laptop may be the P2P-GO.

The exemplary configuration as depicted in FIG. 2 may represent an enterprise scenario, where the optimization of spatial reuse can benefit from a proper multi user grouping as detailed herein. According to an example, the management of wireless docking in enterprise by spatial awareness is enabled as detailed herein, e.g., taking into consideration knowledge of potential interference in between P2P-networks 216a to 216f and/or their interference with the BSS-network 211. According to the method, a mechanism is provided for learning the spatial map and supporting the AP 202 in collecting data on interference and optimizing spatial reuse, where there are multiple short-range P2P networks in its vicinity.

Figure 3:
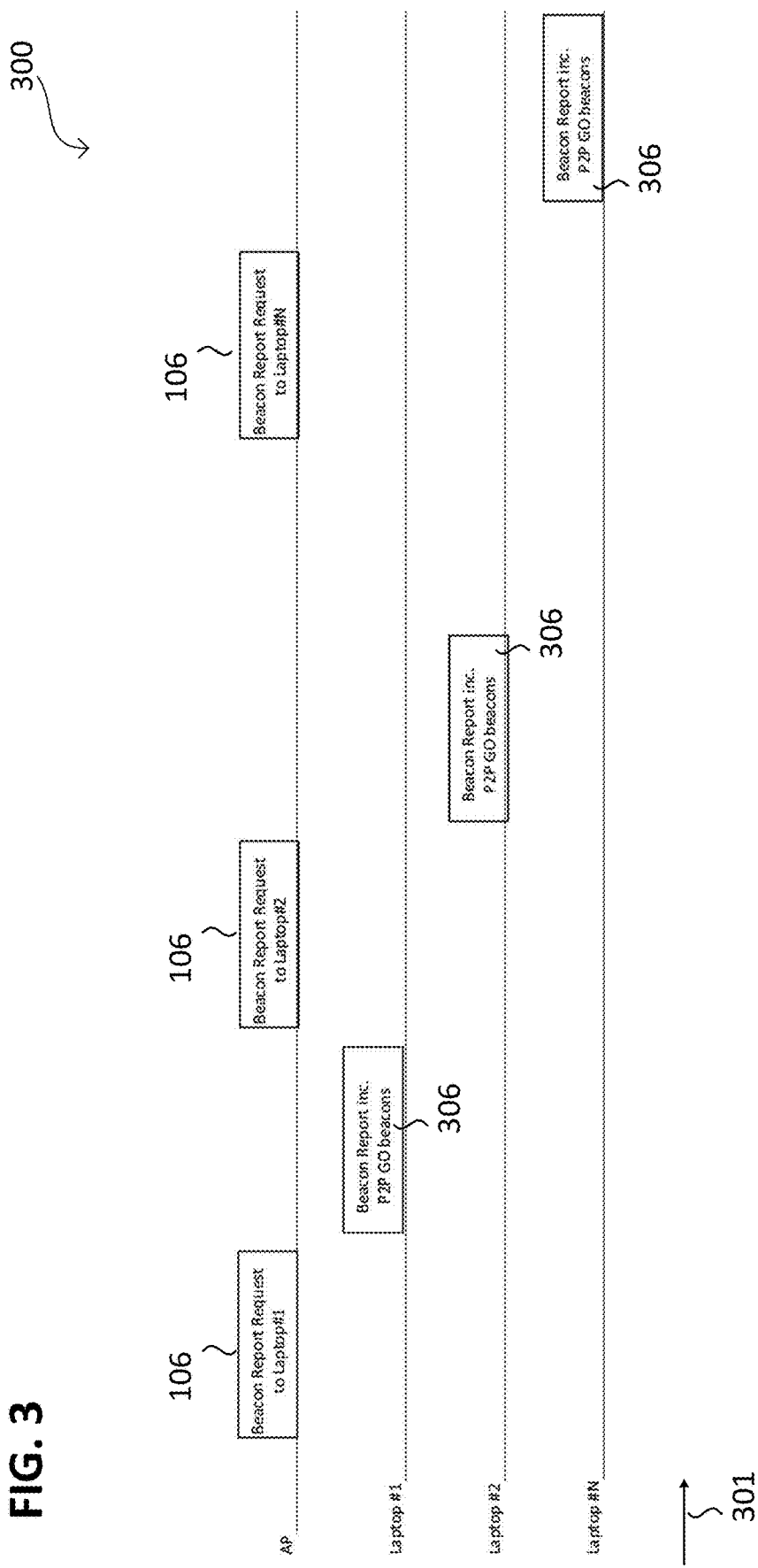
FIG. 3 shows an exemplary method in a communication diagram according to various aspects.

FIG. 3 illustrates an exemplary method according to various aspects in a communication diagram 300, that illustrates the sequence of transmissions over time 301. In the following, reference is made to a request message 106 that includes a request for a beacon report for demonstrative purposes. The references made to the beacon report may analogously apply to another implementation of the request message 106. Examples of implementing the request, may include one or more of the following: a channel load report; a request for capacity of access; a request for periodicity of access; a request for a neighbor report and/or another request to perform one or more measurements of wireless networks in range.

For example, the request of the request message 106 (e.g., its configuration) may be defined by the first wireless network protocol, e.g., its length, field format, data type or the like. This enables using the method without a modification of the first wireless network protocol, e.g., if being a standardized network protocol. For example, the first wireless network protocol may be a network protocol in accordance with IEEE 802.11.

As illustrated in diagram 300, the network component 100 may be configured to transmit a request message 106 to each of multiple clients, e.g., at least three clients (in this example laptop #1 to laptop #3). Each of the multiple clients may be configured to respond to the request message 106 with another message 306 (also referred to as report message 306) including the report as requested. The pair of request message 106 and report message 306 may be in a sequence for the multiple clients. For example, the network component 100 may be configured to send a request message 106 to the next client in response to receiving the report message 306 (as example for a trigger event). Additionally or alternatively, the network component 100 may be configured to send the request message 106 in response to one or more other trigger events as detailed herein.

If the requested client accepts the request for a beacon report (also referred to as "beacon request"), the requested client may be configured to respond with the report message 306 including a radio measurement report frame including at least one beacon report element for each Basic Service Set Identification (BSSID) from which the client senses a beacon or probe response. For each beacon network in range, the beacon report may include one or more of the following beacon report elements: a channel number, a channel band, an actual measurement start time, a measurement duration, a type of the physical layer (also referred to as PHY Type), its BSSID, its RCPI (received channel power indicator), one or more timing synchronization functions, a beacon interval, a capability information.

If the requested client accepts the request for a channel load (also referred to as "channel load request"), the requested client may respond with the report message 306 including a radio measurement report frame including at least one channel load report element. The channel load report element may specify the channel busy condition from the client's view, e.g., of what happens on the specified channel, e.g., indicated by a channel busy fraction. Examples of the channel load report element may include a channel number, a channel band, an actual measurement start time, a measurement duration and the channel busy fraction.

Analogously, a neighbor report may include information if peers or access points are in range of the requested client.

In an exemplary implementation, the client or each client (e.g., a wireless station) may be configured to request one or more network resources from the AP 202. Implementation of the request and network protocol may, in some aspects, be a subject of the definition in a standard and may require a dedication of a bit in the operational capabilities of the client that indicates, when a wireless dock connection is requested (e.g., as a result of P2P-network 216a to 216f discovery).

FIG. 4 graphically illustrates exemplary information about wireless networks within communication range of the wireless network client in respective RCPI diagrams 400a, 400b, e.g., which the requested client my report. As example, the information may include a measurement indication received from or by one or more wireless networks within the communication range of the requested client. Examples of the measurement indication may include a received channel power indicator (RCPI), a received signal strength indicator (RSSI) and/or a received signal to noise indicator (RSNI), among others. The measurement indication (e.g., RCPI, RSNI or RSSI) may be in accordance with the BSS-network protocol, e.g., in accordance with IEEE 802.11.

Providing the RCPI may include measuring, by the client, the received radio frequency power in a selected channel over the preamble and the entire received frame. Providing the RSSI may include measuring, by the client, the power present in a received radio signal. Providing the RSNI may include measuring, by the client, the Signal to Noise and Interference Ratio present for a received radio signal.

Herein, reference is made to RCPI as reported information for demonstrative purposes. The references made to RCPI may analogously apply to another type of information as outlined herein, e.g., RSSI and/or RSNI.

In the illustrative example as depicted in FIG. 4, a first client 212a may report a RCPI 400a, e.g., indicating a high channel power at channel 2, a medium channel power at channel 5 and a low power at channels 1, 3, 4, 6, and 7. In the illustrative example as depicted in FIG. 4, a second client 212b may report a RCPI 400b, e.g., indicating a high channel power at channel 1, a medium channel power at channel 6 and a low power at channels 2 to 5, and 7. For example, the first client 212a may use channel 1 to communicate via the first P2P-network 216a. For example, the second client 212b may use channel 2 to communicate via the second P2P-network 216b.

A channel (also referred to as communication channel) may be understood as a specific radio frequency, pair or band of frequencies, for example, named with a letter, number (here 1 to 7), or codeword, and/or allocated by an international agreement. Each channel may have a certain capacity for transmitting information, e.g., measured by its bandwidth in Hz (Hertz) or its data rate (e.g., in bits per second). For example, a network in accordance with IEEE802.11 may use 13 channels from 2412 MHz (Megahertz) to 2484 MHz in 5 MHz steps.

Based on the measurement indication received from or by one or more wireless networks within the communication range of the client or each client, the network component 100 may determine a network model (also referred to as environmental network model). The network model (NM) may represent the usage of radio frequencies (e.g., channels) by second wireless networks in the range of one or more requested clients and/or in the range of the first wireless network.

Analogously, the usage of radio frequencies may also be determined based on RSNI and/or RSSI. Additionally or alternatively, other measures may be used that provide information of various types about the one or more wireless networks within the communication range of the client.

Examples of the reported information and/or the information as implemented by network model may include a channel, a phase of the subcarrier, a spatial distribution (e.g., range and/or accessibility), a transmission rate, a BSSID, one or more entities connected to the respective wireless network, time and/or duration of occurrence of the respective wireless network, and the like. Said information may apply to each second wireless network that is in range of at least one of the one or more clients.

As explained in more detail herein, the grouping may optionally be based on the network model. For example, the network component 100 may determine a parameter (also referred to as interference parameter) that represents an amount of interference between the P2P-network 216a to 216f in range of the client or each client. If the interference parameter fulfils a predetermined (e.g., saved) criterion, for the P2P-networks 216a to 216f of two P2P-pairs, the clients of the two P2P-pairs are assigned to different schedule groups. Illustratively, the interference parameter may represent an amount of overlap between the two P2P-networks 216a to 216f.

In an example for implementation, the RCPI may be used as interference parameter. For example, in case that two P2P-networks 216a to 216f are interfering in the same channel, the respective clients are assigned to different schedule groups. Additionally or alternatively, the interference parameter may include one or more of the above mentioned measures. Additional information about the network environment may increase the accuracy of the network model, and thus, optimize the grouping. As a WLAN network is implementing collision detection and LBT (Listen Before Talk) with RCPI thresholds determined by regulatory bodies and 802.11, comparing RCPI of peers to thresholds may be a primary but insufficient indication of the ability of networks to achieve sufficient spatial resolution. If RCPI is below threshold, a secondary criteria may be transmission rate, etc.

In other examples, the network model may indicate a reserved capacity in accordance with a P2P-network 216a to 216f and/or periodicity for medium access in accordance with a P2P-network 216a to 216f. For example, the interference parameter may also include the reserved capacity and/or the periodicity for medium access. This increases the amount of information about the network environment that is available.

In a similar manner, the AP or each AP that provides the BSS-network 211 may optionally be configured to provide one or more of the above information types about a wireless networks within its communication range. This increases the amount of information about the network environment that is available.

In an exemplary implementation, the AP 202 may be configured to determine a spatial map as network model by aggregating measurements by its own receiver (Rx) and aggregating reports from the one or more clients under its control, e.g., using the BSS-network protocol (e.g., using an IEEE802.11 protocol), such as for example, neighbor report. Additionally or alternatively, the AP 202 may be configured to send beacon report request(s) to the one or more clients under its control, requesting one or more of the client (e.g., each of the clients) to report the RCPI and other measurements (e.g. sounding against its peer) of neighboring network devices 214a to 214f (e.g., docks) that are transmitting P2P-GO-beacons.

Figure 5:
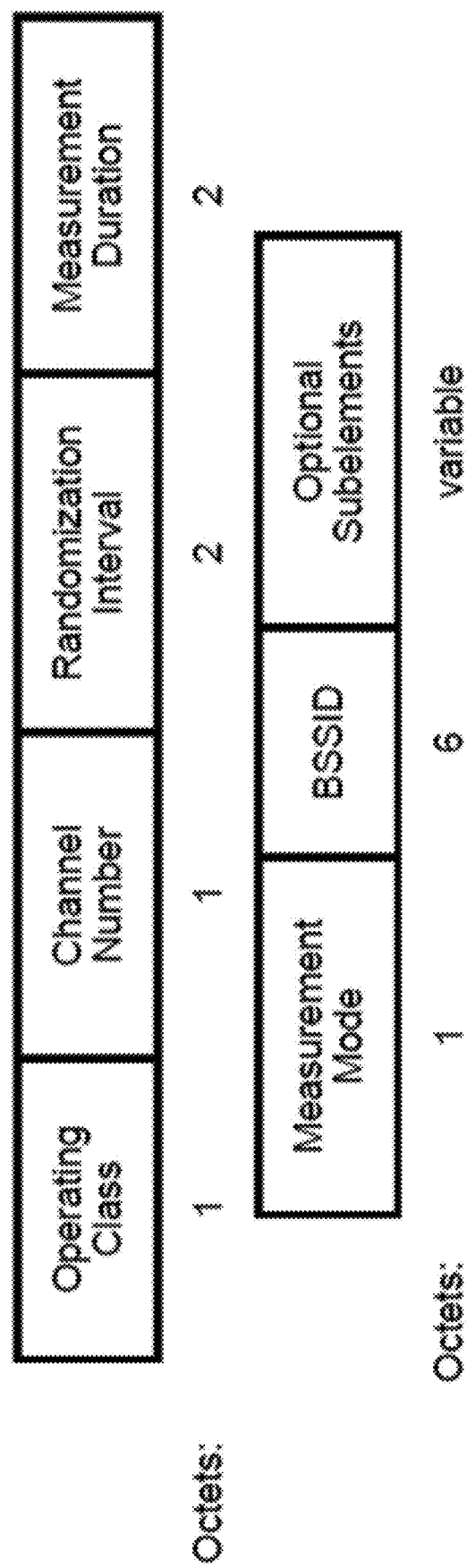
FIG. 5 shows an exemplary beacon request in accordance with IEEE 802.11 in a field diagram according to various aspects.

FIG. 5 illustrates an exemplary beacon request in accordance with IEEE 802.11 in a field diagram 500 according to various aspects, depicting the measurement request field format for the beacon request.

Figure 6:
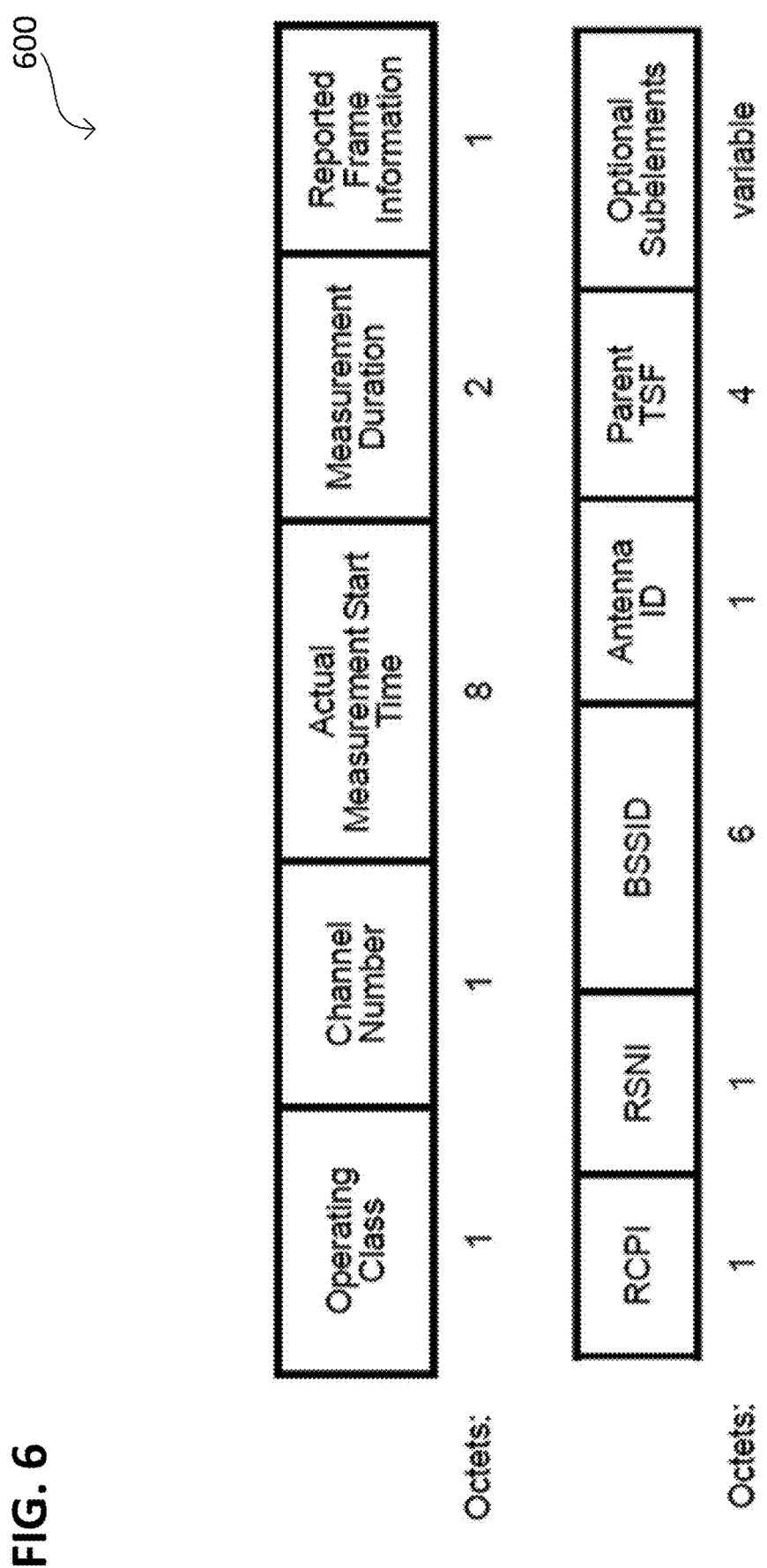
FIG. 6 shows an exemplary response to a beacon request in accordance with IEEE 802.11 in a field diagram according to various aspects.

FIG. 6 illustrates an exemplary response to a beacon request (also referred to as "beacon response") in accordance with IEEE 802.11 in a field diagram 600 according to various aspects, depicting the measurement report field format for the beacon response.

Figure 7:
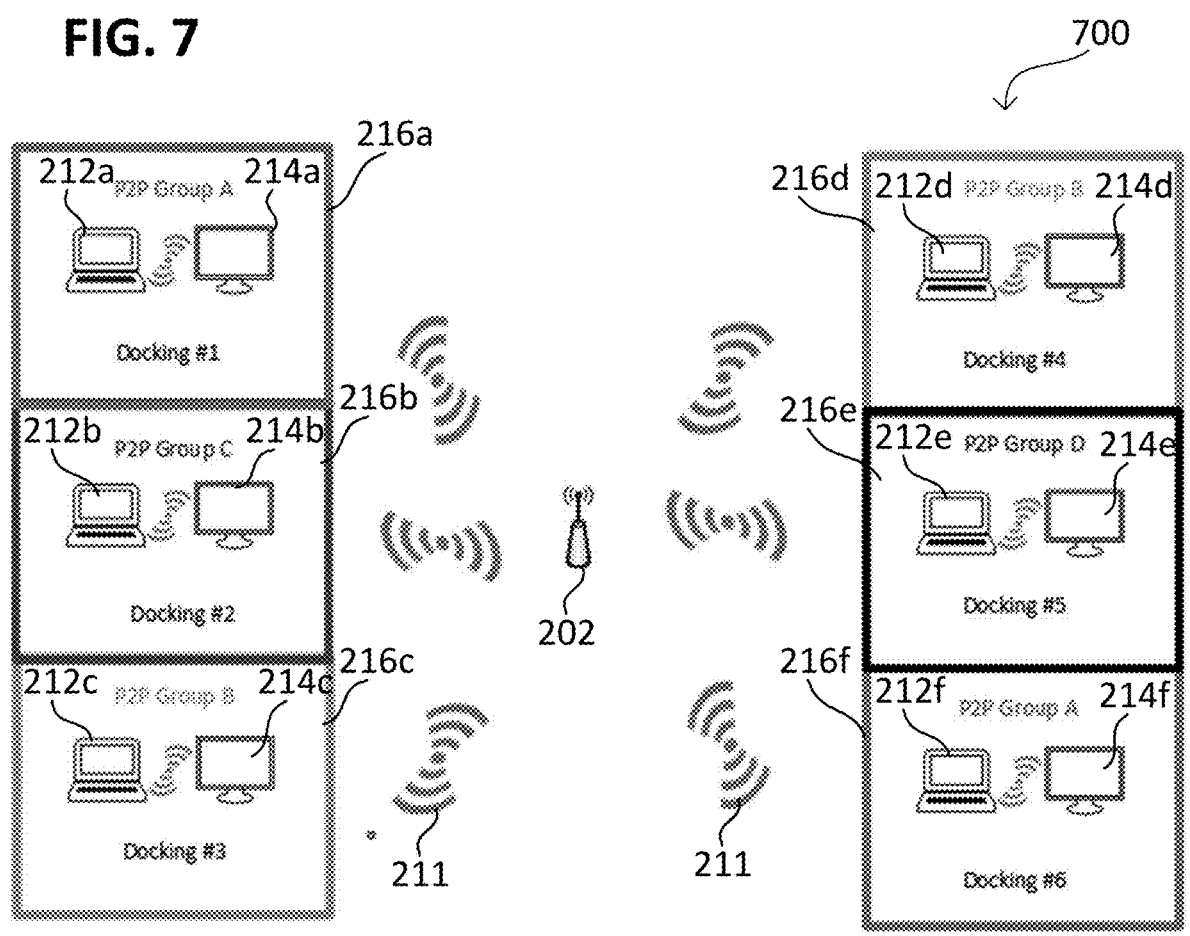
FIG. 7 shows an exemplary system in a schematic grouping diagram according to various aspects.

FIG. 7 illustrates an exemplary system 200 in a schematic grouping diagram 700 according to various aspects.

In the exemplary result of the grouping as depicted in FIG. 7, one or more schedule groups are assigned each to two or more laptops. As illustrated, the laptops 212a, 212f of Docking #1 and Docking #6 are assigned to schedule group A and the laptops 212c, 212d of Docking #3 and Docking #4 are assigned to schedule group B.

In the exemplary result of the grouping as depicted in FIG. 7, one or more schedule groups are assigned each to a maximum of one laptop, e.g., the laptop 212b of Docking #2 is assigned to schedule group C and the laptop 202e of Docking #5 is assigned to schedule group D.

For the simplicity of the examples herein, it was assumed that only the laptop is communicating with the AP 202, that is via the BSS-network 211. However, as described above, the role of the laptop and the docking station may be reversed. That is, the client of the BSS-network 211 may be either one of the P2P-pairs, e.g., the laptop or the docking station, or both or neither.

The AP 202 may be configured to determine the network model determined based on the response message(s) 306 of the laptop(s) and optionally based on additional data beyond RSSI and/or RCPI that is reported by a beacon report. This may contribute to better spatial and interference mapping. The AP 202 may be configured to request such additional data, for example, via the request message 106. As example, the request message 106 may include instructions to perform a P2P-sounding (e.g., as done for beam forming), resulting in additional data on the channel between peers. Additionally or alternatively, the request message 106 may include instructions to perform sounding of the other links based of schedule group triggered transmissions that are already scheduled. Additionally or alternatively, the request message 106 may include instructions to respond by a dummy transmission, e.g., from one or more candidate P2P-peers.

The AP 202 may be configured to continually adapt the grouping, for example, in response to a new link joining (e.g., by coupling) as triggering event and/or a link leaving (e.g., by decoupling) the BSS-network 211 as triggering event. In this case, when the AP 202 requests a specific schedule group, all other clients may be configured to perform signal-to-noise (SNR) and/or channel estimations, which may be fed back to the AP 202 to better refine the network model, the grouping decision and/or station parameters (e.g., Tx power, beamforming, Modulation and Coding Scheme (MCS)) beyond the elements of the beacon report.

Within the method, the AP 202 may be configured to group P2P-networks 216a to 216f and optionally allocate resources based on client requests, while trying to minimize/optimize the spatial interference between the clients by assigning specific clients that are part of a small cell P2P-network to multi user groups. Each of the schedule groups may include or be formed from members having sufficient spatial separation to optimize cross P2P-network congestion and interference. The grouping algorithm may, in some aspects, be implementation specific.

The configuration of FIG. 7 may be applicable to an office environment under the coverage of one or more APs 202. The AP 202 may be configured to receive (e.g., collect) one or more beacon reports and optional sense, by sensors of the AP 202, a signal strength of its clients. Further, the AP 202 may be configured to determine if and how the P2P-pairs are assigned to the schedule groups, e.g., to 4 multi use P2P-groups A to D.

It may be understood, that the AP 202 may be configured to re-group the system 200 in response to a trigger event. The re-grouping may include changing the schedule group that is assigned to at least one client and/or changing the number of the plurality of schedule groups (e.g., when a client disconnects from the BSS-network 211). As response to the re-grouping, the AP 202 may re-schedule one or more (e.g., each) of the clients.

Figure 8:
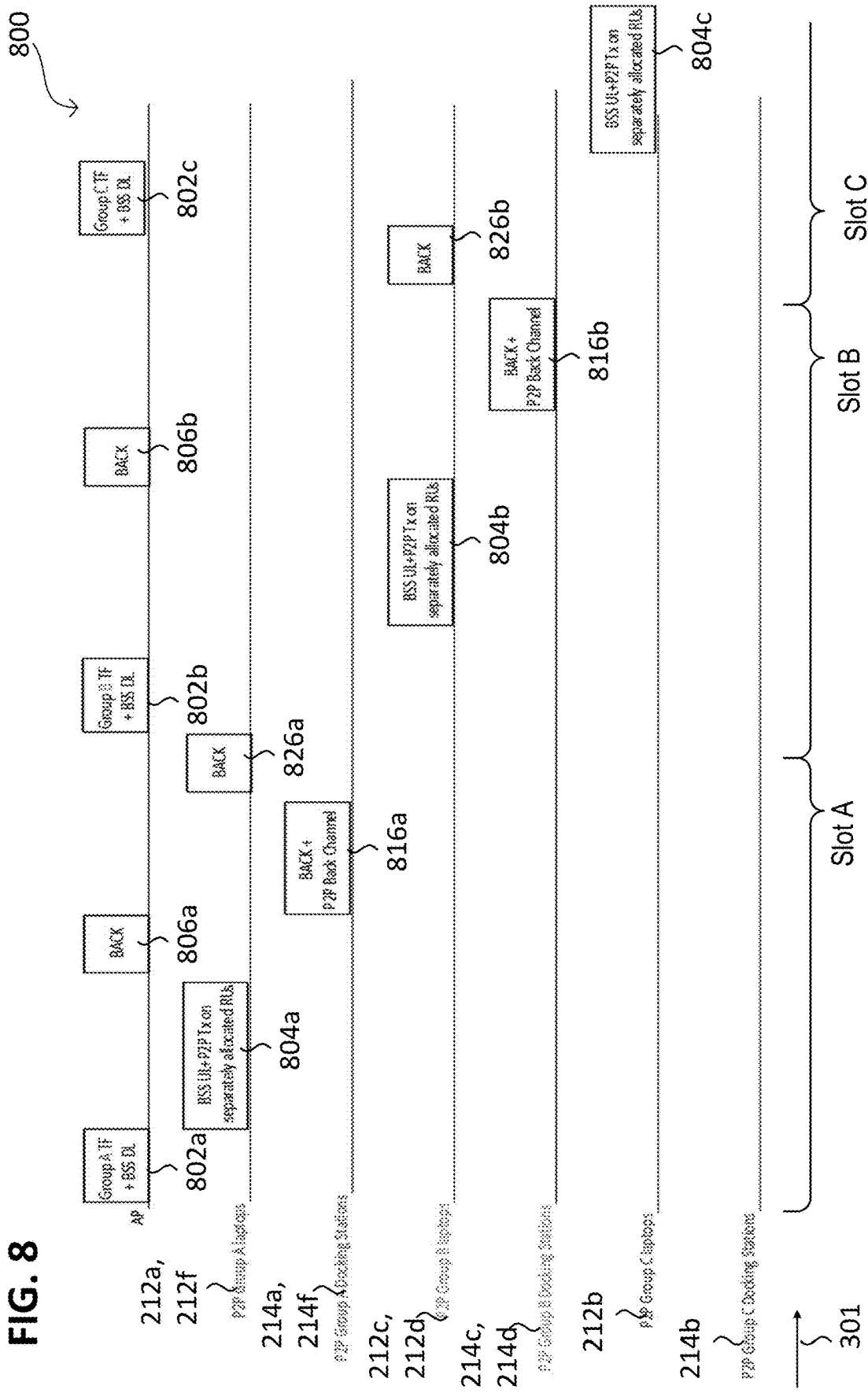
FIG. 8 shows an exemplary method in a schematic communication diagram according to various aspects.

FIG. 8 illustrates an exemplary method in a communication diagram 800 according to various aspects, that illustrates the sequence of transmissions over time 301, in which an example of the scheduling of the transmissions (according to frames) in accordance with the BSS-network protocol and the P2P-network protocol is depicted. The communication diagram 800 illustrates an excerpt of the transmission period 111, in which multiple transmission slots A to C (also referred to as slots) are visible. In this example, slot A is allocated to schedule group A, slot B is allocated to schedule group B, and slot C is allocated to schedule group C. As result of the scheduling, a slot of the transmission period 111 may be allocated to each of the schedule groups (resulting from the grouping) or the respective clients of the schedule group. The schedule groups may differ from each other based on the slot allocated to them. Clients of the same schedule group may share a common slot allocated to them. Analogously, the clients of different schedule groups differ from each other based on the slot allocated to them.

For the sake of facilitated understanding, the components assigned to a schedule group, e.g., the one or more P2P-pairs assigned to the schedule group, the clients assigned to the schedule group and the network devices assigned to the schedule group, to which a slot is allocated, are also referred to as P2P-pairs of the slot, clients of the slot, and the network devices of the slot.

In each of the slots A to C, the network component 100a may be configured to generate a trigger message 802a to 802c (also referred to as "trigger uplink") to the one or more clients of the slot. In response thereto, the one or more clients of the slot may be configured to transmit data 804a to 804c via the BSS-network 211 within the slot.

Further, the transmission block 804a to 804c of each of the slots A to C may include the instruction message 116 to each of the clients of the slot. Scheduling of the transmission via the P2P-network (e.g., by the client) to be within the slot may be a response to receiving the transmission block 804a to 804c of the slot. For example, each client of a slot may be configured to control scheduling of the transmission via its individual P2P-network 216a to 216f, to which the client is coupled, in accordance to the scheduling of the slot.

The clients of the slot and/or the network component 100 may be configured to acknowledge the transmission 804a to 804c via the BSS-network 211, in each of the slots. Analogously, the clients of the slot and/or the network devices 214a to 214f of the slot may be configured to acknowledge 816a, 816b, 826a, 826b the transmission 804a to 804c via the P2P-network 216a to 216f, in each of the slots.

For acknowledgment 806a, 806b, 816a, 816b, 826a, 826b, the respective component (e.g., client of the slot, network device of the slot, or the network component) may be configured to generate an acknowledgment message 806a, 806b, 816a, 816b, 826a, 826b to the source of the transmission 804a to 804c. In the exemplary communication diagram 800, the acknowledgment message 806a, 806b, 816a, 816b, 826a, 826b may include a block acknowledgement (also referred to as BACK or BA). The acknowledgment message 806a, 806b, 816a, 816b, 826a, 826b may acknowledge the transmission block 804a to 804c including one or more protocol data units (PDU). Each PDU may include network protocol specific control information and user data. For example, the acknowledgment message 806a, 806b may include at least one acknowledgment indicator (e.g., bit) for each PDU of the transmission block 804a to 804c, among others.

The transmission block 804a to 804c may include separately allocated Resource Units (RU). A RU may, for example, refer to a unit in orthogonal frequency-division multiple access (OFDMA) terminology used in 802.11ax WLAN to denote a group of subcarriers (tones) used in both DownLink (DL) and UpLink (UL) transmission directions.

Figure 9:
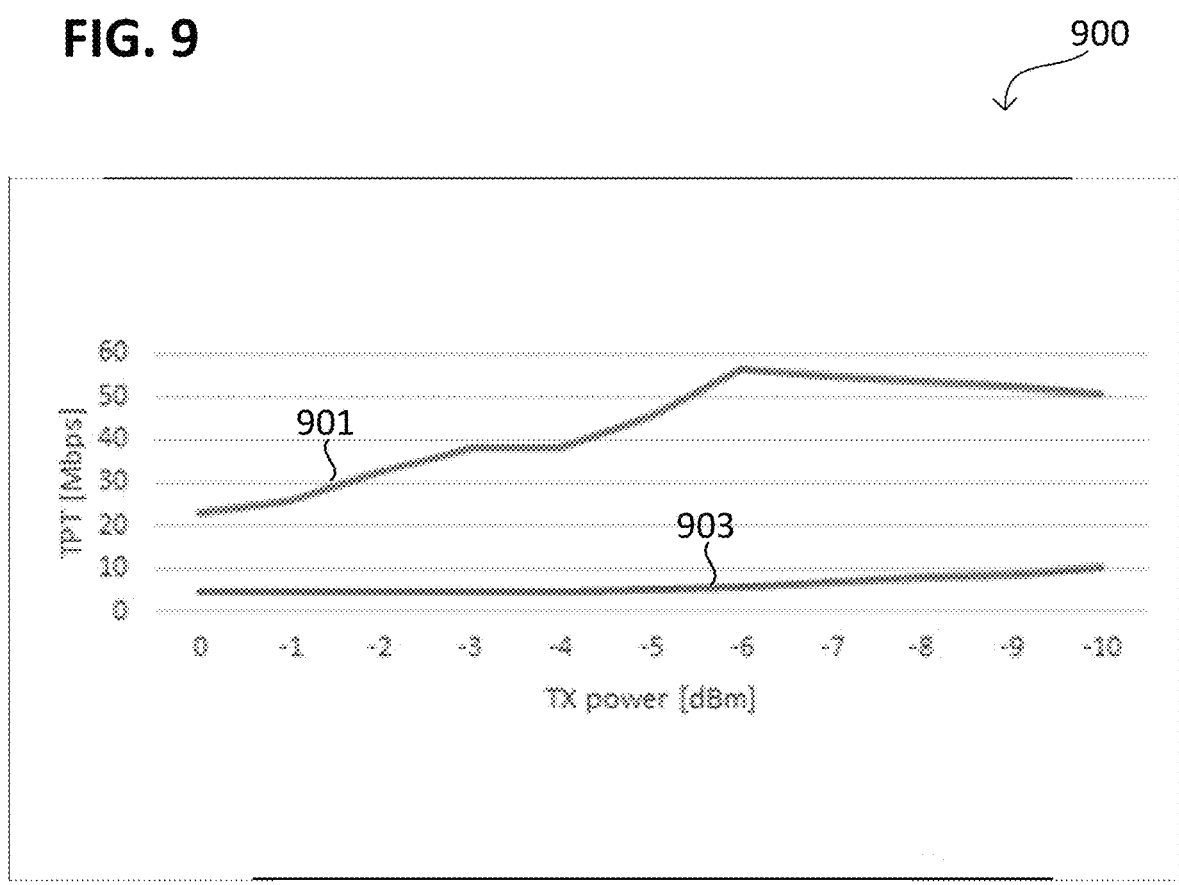
FIG. 9 shows exemplary performance of a P2P-network in a schematic diagram according to various aspects.

FIG. 9 illustrates an exemplary performance of the P2P-network 216a to 216f in a diagram 900, in which the throughput (TPT, that is the rate of information that is transferred), in Megabits per second (Mbps), is depicted over the Tx power, in Decibel-Milliwatt (dBM), for of transmissions via the P2P-network 216a to 216f Graph 901 represents the performance according to various aspects, e.g., achieved by applying the method. Graph 903 represents the conventional performance, e.g., suffering from network-to-network interference. For example, diagram 900 may correspond to a Wi-Fi 6 environment with P2P-wireless docking at a 20 Megahertz channel.

For example, the maximal achievable TPT 901 for each P2P-cell in an enterprise environment may be more than 400% of the conventional TPT 903.

According to various aspects, "next hops" (illustratively, network-to-network scheduling synchronization) of resource allocation (e.g., transmission/receptions by the serving entities to other unconnected entities) are provided in order to establish a Wireless Collaborative Network (WCN), e.g., in accordance with IEEE802.11ax and IEEE801.11be (e.g., contributions and drafts). The provided mechanism may assist in wireless docking, e.g., by enabling efficient spectrum sharing of infrastructure networks and multiple wireless docking stations.

According to various aspects, the method (e.g., implemented by an AP) includes controlling a resource allocation mechanism for a Wireless Collaborative Network (WCN). The allocation mechanism may be simplified in some cases, e.g., when the P2P-network(s) is/are limited to very short-range peers, such as, for example, a laptop and its peer docking station(s) (also referred to as "dock"). Illustratively, the latter enables to assume that the dock environment is similar to its peer laptop environment. As the dock may not necessarily be a member of a BSS-network, data collection from the dock, if necessary, could have complicate a solution.

For example, the mechanism may control airtime and congestion of one or more P2P-networks sharing spectrum with an infrastructure network managed by an EHT (Extremely High Throughput) Access Point, e.g., in accordance with IEEE 802.11ax (Wi-Fi 6) or IEEE 802.11be (Wi-Fi 7), by scheduling the P2P-traffic using enhancements to trigger frame.

The required processes or protocols that enable the AP to schedule and control the P2P-traffic of multiple P2P-networks may be provided (e.g., adapted) according to the requirements, e.g., for optimizing spatial reuse and air time use.

Further aspects applicable to the above examples are described in the following.

As a part of the spatial optimization provided by the AP 202, the AP 202 may be configured to optimize the transmission opportunity (TxOP) duration that it uses, as well as the triggering intervals, and may be configured to instruct the P2P-pairs any constraints on Tx power backoff and the transmission rate (PHY rate) and/or MCS. This may provide for achieving optimized tradeoffs between spatial separation and channel utilization.

The above described mechanism may be extended to scenarios having multiple APs 202 covering an area by having the APs communicating with each other for sharing spatial data collection and aligning their schedule mapping accordingly.

The AP 202 may periodically (or upon new association or roaming of stations under its control, or following a notification of docking state from one of its clients) be configured to sense one or more P2P-GO-beacons and RSSI from its associated clients (also referred to as stations) and may be configured to combine the sensed data it with beacon reports and optional other (e.g. sounding) reports collected from the associated clients. Based in the data and/or reports, the AP 202 may be configured to perform the grouping or update the result of the grouping for optimizing spatial reuse.

The AP 202 may, in some aspects, be configured to implement additional controlling for optimizing the spatial and air time reuse of a hierarchal network architecture. Examples of the additional controlling may include: orthogonal frequency division multiple access (OFDMA) resource unit allocation allowing concurrent transmissions of P2P-pairs utilizing spectral separation; scheduling of one or more P2P-transmissions by another method than triggered directly, e.g., such as a distribution of the transmission schedule to the or each P2P-network and/or the respective client under its control (e.g., using scheduling maps as defined in IEEE 802.1Q, and time synchronization as defined in IEEE 802.1as or in contributions to IEEE802.11be); extend the scheduling to support separate scheduling and TxOP allocation of traffic (e.g., based on quality of service of transmitted frames, providing preferred latency to frames containing video, audio or control).

According to various aspects, the second wireless network may be configured to communicate its request of reserved capacity and periodicity for medium access to the network component 100. For example, the grouping may optionally be based on the resource allocation and/or a request for resource allocation.

According to various aspects, each of the plurality of scheduling groups may be assigned to one or more second wireless networks, e.g., P2P-networks 216a to 216f, that is/are under the scheduling control of the network component 100 (e.g., providing a scheduling device).

Potential environments that may benefit from the mechanism as described herein may include a call center, an office, an engineering environment, among others.

Figure 10:
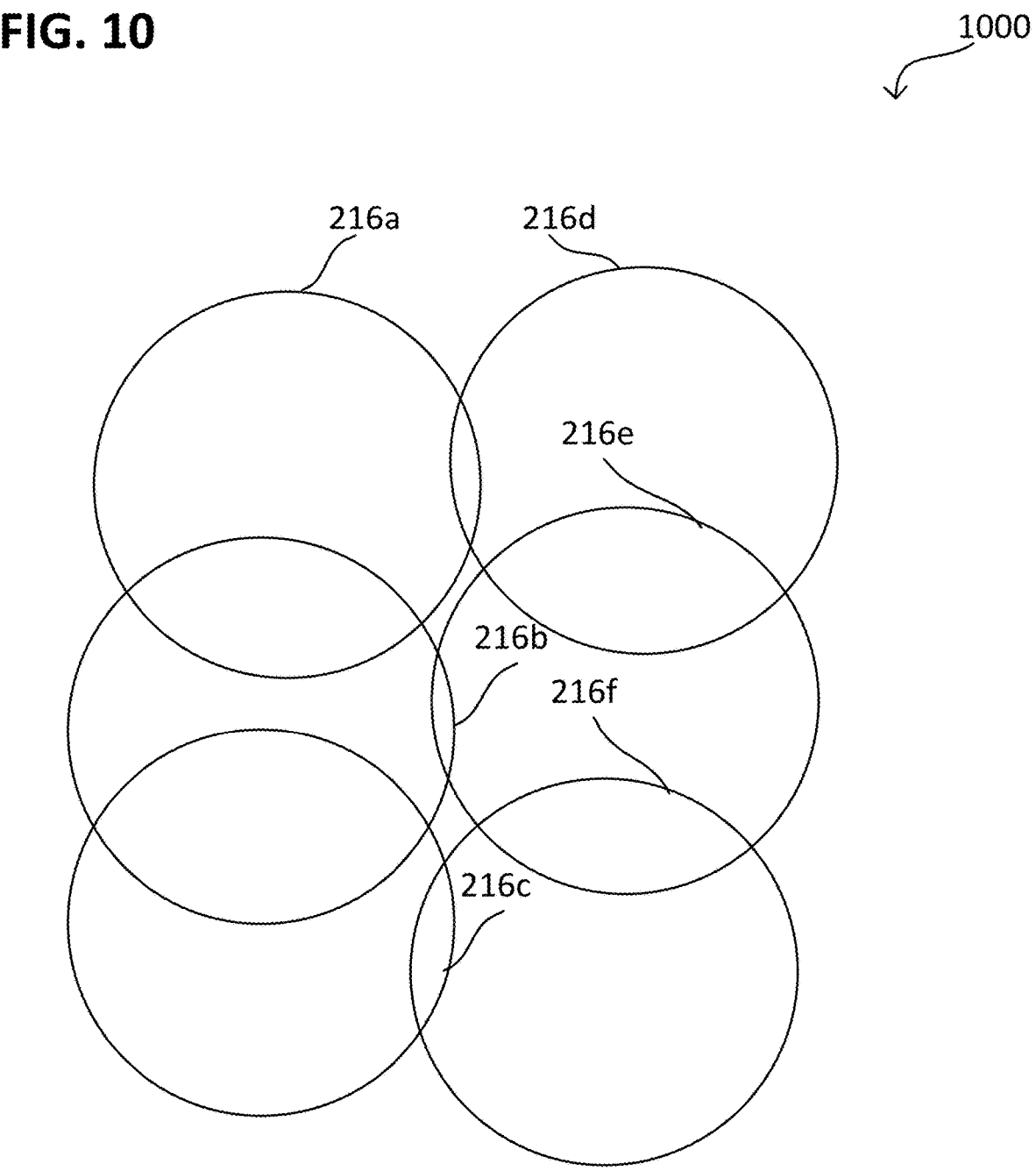
FIGS. 10 and 11 respectively show an exemplary network model in a schematic diagram according to various aspects.

FIG. 10 illustrates a network model in a schematic diagram 1000 according to various aspects. For example, the circles in schematic diagram 1000 may represent equipotential lines of the signal strength of each of the second wireless networks, e.g., P2P-networks 216a to 216f.

In the exemplary implementation of the network model as illustrated in FIG. 10, the network model may implement a plurality of parameters (e.g., coordinates) that represent a spatial distribution of each of the second wireless networks 216a to 216f, e.g., indicating their distance from each other and/or from the AP 202, indicating their range, and/or indicating their spatial overlap. Said more generally, the network model in schematic diagram 1000 may include a virtual representation of the networks of system 200. Based on the parameters, the network component 100 may determine a degree of overlap, e.g., providing the information of the following diagram 1100.

Figure 11:
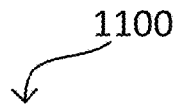

FIG. 11 illustrates a network model in a schematic diagram 1100 according to various aspects. In the exemplary implementation of the network model as illustrated in FIG. 11, the network model may implement a plurality of parameters (here exemplary a value between 0 and 10) that represent the pairwise degree of overlap of the second wireless networks 216a to 216f, e.g., indicating their grade of interference with each other, indicating their frequency overlap, and/or indicating their spatial overlap.

If the degree of overlap of two or more second wireless networks fulfils a (e.g., predetermined) criterion (e.g., being below a threshold, e.g., being zero), the two or more second wireless networks may be assigned to the same scheduling group. Otherwise the two or more second wireless networks may be assigned to different scheduling groups. The criterion and the type of parameter may be selected according to the respective application, the acceptable degree of overlap, and/or the current environment.

Figure 12:
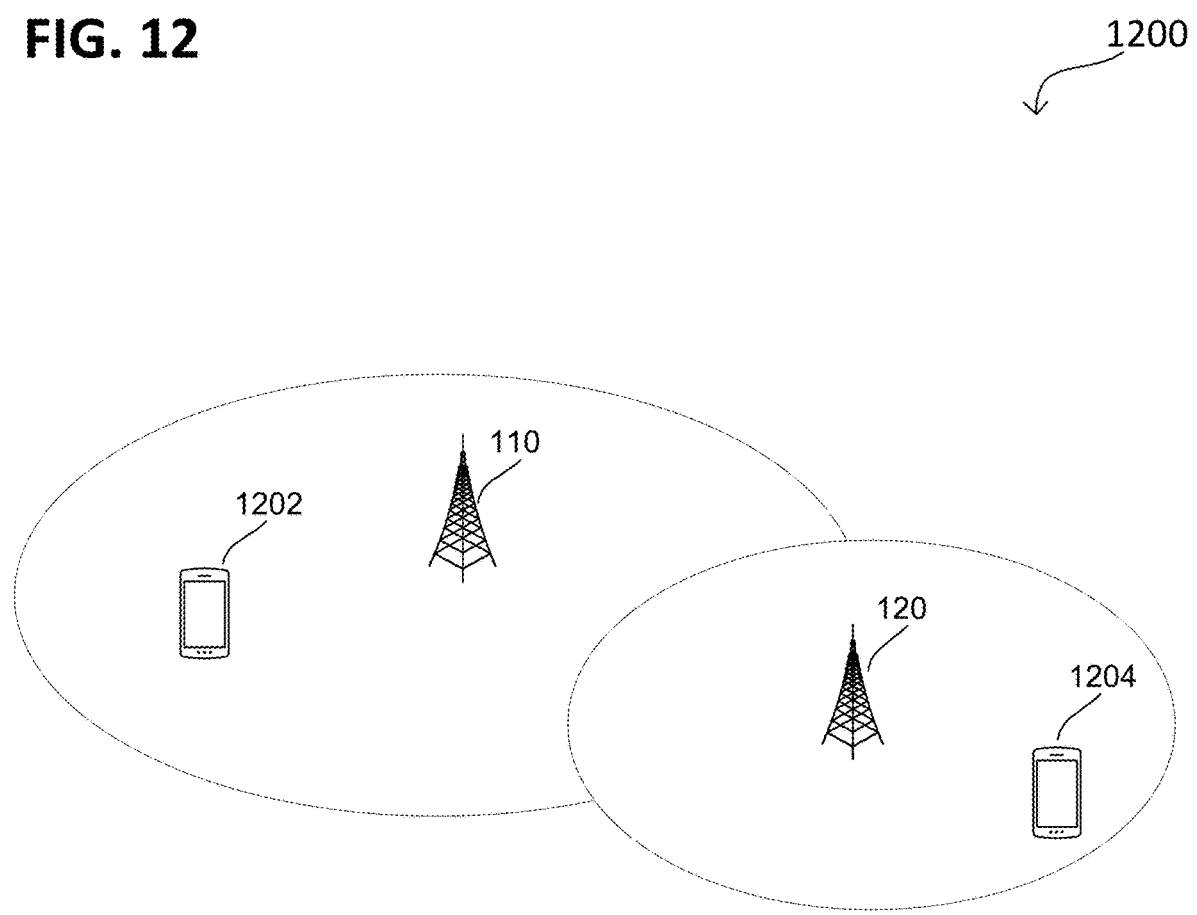
FIGS. 12 and 13 respectively show an exemplary network and device architecture for wireless communications in schematic diagrams.
Figure 13:
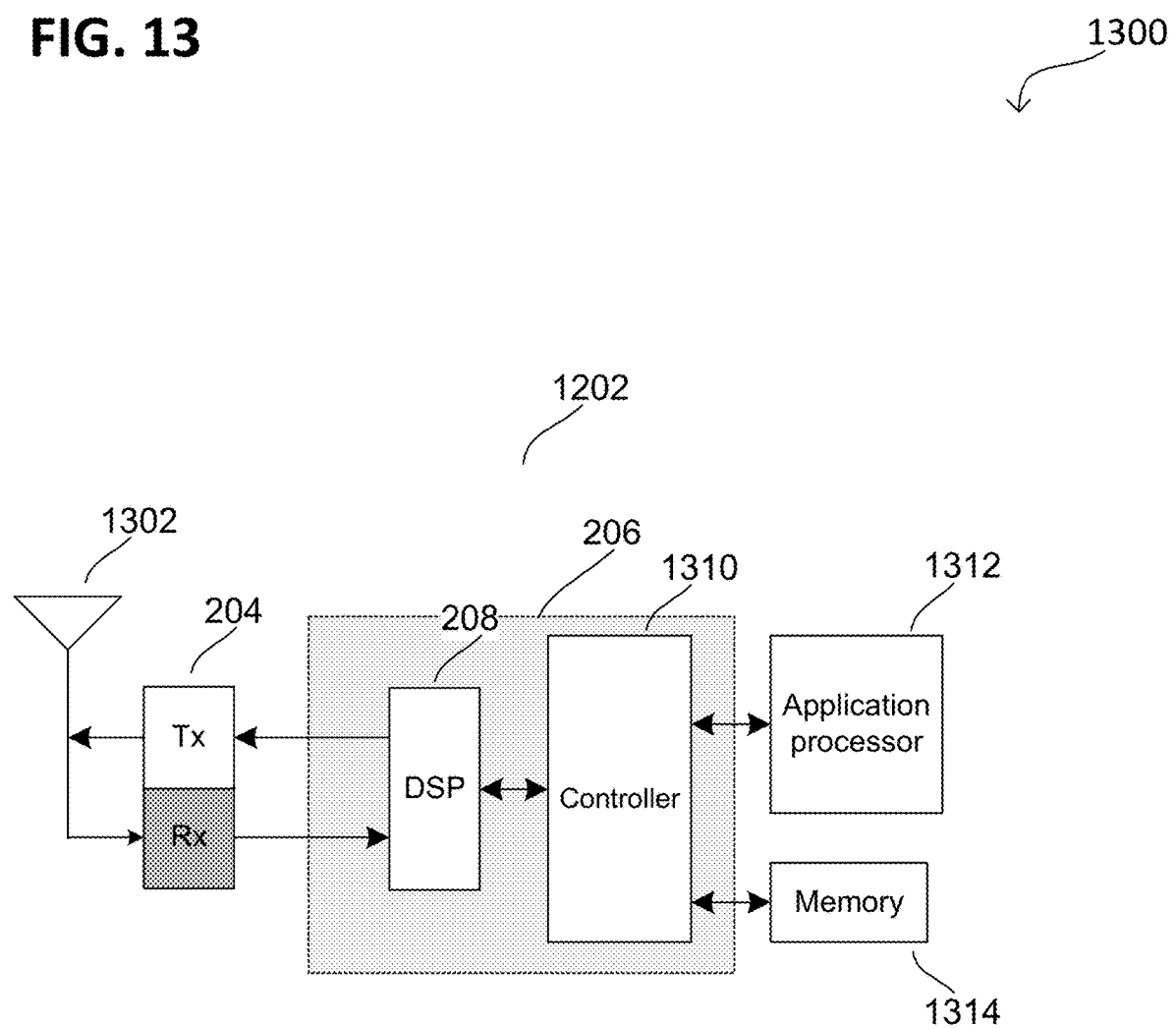

FIGS. 12 and 13 depict an exemplary network and device architecture for wireless communications in schematic diagrams. In particular, FIG. 12 shows exemplary radio communication network 1200 according to some aspects, which may include terminal devices 1202 and 1204 as clients and network access nodes 110 and 120. Radio communication network 1200 may communicate with terminal devices 1202 and 1204 via network access nodes 110 and 120 over a radio access network as example for the first wireless network. Although certain examples described herein may refer to a particular radio access network context (e.g., WLAN/WiFi, Bluetooth, mmWave, etc.), these examples are demonstrative and may therefore be readily applied to any other type or configuration of radio access network. The number of network access nodes and terminal devices in radio communication network 1200 is exemplary and is scalable to any amount.

In an exemplary WLAN context, network access nodes 110 and 120 may be base stations (e.g., wireless routers, or any other type of base station), while terminal devices 1202 and 1204 may be WLAN terminal devices (e.g., Mobile Stations (MSs), User Equipment (UE), or any type of WLAN terminal device). Network access nodes 110 and 120 may optionally interface (e.g., via backhaul interfaces) with a wireless WLAN core network or wired core networks, which may also be considered part of radio communication network 1200. The WLAN core network may interface with one or more external data networks. In an exemplary short-range context, network access node 110 and 120 may be access points 202 (APs, e.g., WLAN or Wi-Fi APs), while terminal device 1202 and 1204 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 1200 not explicitly shown in FIG. 12) may accordingly provide a radio access network to terminal devices 1202 and 1204 (and, optionally, other terminal devices of radio communication network 1200 not explicitly shown in FIG. 12). In an exemplary WLAN context, the radio access network provided by network access nodes 110 and 120 may enable terminal devices 1202 and 1204 to wirelessly access the core network via radio communications. The core network may provide switching, routing, and transmission, for traffic data related to terminal devices 1202 and 1204, and may further provide access to various internal data networks (e.g., control nodes, routing nodes that transfer information between other terminal devices on radio communication network 1200, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 1200) and external data networks (e.g., data networks providing voice, text, multimedia (audio, video, image), and other Internet and application data).

The radio access network and core network (if applicable, such as for a cellular context) of radio communication network 1200 may be governed by network communication protocols (also referred to as network protocol) that can vary depending on the specifics of radio communication network 1200. Such network protocols may define the scheduling, formatting, and routing of both user and control data traffic through radio communication network 1200, which includes the transmission and reception of such data through both the radio access and core network domains of radio communication network 1200. Accordingly, terminal devices 1202 and 1204 and network access nodes 110 and 120 may follow the defined network protocols to transmit and receive data over the radio access network domain of radio communication network 1200, while the core network may follow the defined network protocols to route data within and outside of the core network. Exemplary network protocols include Bluetooth, WiFi, mmWave, etc., any of which may be applicable to radio communication network 1200.

FIG. 13 shows an exemplary internal configuration of terminal device 1202 as example for the client according to some aspects in diagram 1300. Terminal device 1202 may include antenna system 1302, radio frequency (RF) transceiver 204, baseband modem 206 (including digital signal processor 208 and protocol controller 1310), application processor 212, and memory 1314. Although not explicitly shown in FIG. 13, in some aspects, terminal device 1202 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 1202 may transmit and receive radio signals on one or more radio access networks. Baseband modem 206 may direct such communication functionality of terminal device 1202 according to the network protocols associated with each radio access network, and may execute control over antenna system 1302 and RF transceiver 204 to transmit and receive radio signals according to the formatting and scheduling parameters defined by each network protocol. Although various practical designs may include separate communication components for each supported radio communication technology (e.g., a separate antenna, RF transceiver, digital signal processor, and controller), for purposes of conciseness the configuration of terminal device 1202 shown in FIG. 13 depicts only a single instance of such components.

Terminal device 1202 may transmit and receive wireless signals with antenna system 1302, which may be a single antenna or an antenna array that includes multiple antennas. In some aspects, antenna system 1302 may additionally include analog antenna combination and/or beamforming circuitry. In the receive (Rx) path, RF transceiver 204 may receive analog radio frequency signals from antenna system 1302 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (Tx) path, RF transceiver 204 may receive digital baseband samples from baseband modem 206 and perform analog and digital RF front-end processing on the digital baseband samples to produce analog radio frequency signals to provide to antenna system 1302 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 1302. In some aspects baseband modem 206 may control the radio transmission and reception of RF transceiver 204, including specifying the transmit and receive radio frequencies for operation of RF transceiver 204.

As shown in FIG. 13, baseband modem 206 may include digital signal processor 208, which may perform physical layer (PHY, Layer 1) transmission and reception processing to, in the transmit path, prepare outgoing transmit data provided by protocol controller 1310 for transmission via RF transceiver 204, and, in the receive path, prepare incoming received data provided by RF transceiver 204 for processing by protocol controller 1310. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 1202 may be configured to operate according to one or more radio communication technologies. Digital signal processor 208 may be responsible for lower-layer processing functions (e.g., Layer 1/PHY) of the radio communication technologies, while protocol controller 1310 may be responsible for upper-layer protocol stack functions (e.g., Data Link Layer/Layer 2 and/or Network Layer/Layer 3). Protocol controller 1310 may thus be responsible for controlling the radio communication components of terminal device 1202 (antenna system 1302, RF transceiver 204, and digital signal processor 208) in accordance with the network protocols of each supported radio communication technology, and accordingly may represent the Access Stratum and Non-Access Stratum (NAS) (also encompassing Layer 2 and Layer 3) of each supported radio communication technology. Protocol controller 1310 may be structurally embodied as a processor configured to execute protocol stack software (retrieved from a controller memory) and subsequently control the radio communication components of terminal device 1202 to transmit and receive communication signals in accordance with the corresponding protocol stack control logic defined in the protocol stack software. Protocol controller 1310 may include one or more processors configured to retrieve and execute program code that defines the upper-layer protocol stack logic for one or more radio communication technologies, which can include Data Link Layer/Layer 2 and Network Layer/Layer 3 functions. Protocol controller 1310 may be configured to perform both user-plane and control-plane functions to facilitate the transfer of application layer data to and from radio terminal device 1202 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 1310 may include executable instructions that define the logic of such functions.

In some aspects, terminal device 1202 may be configured to transmit and receive data according to multiple radio communication technologies. Accordingly, in some aspects one or more of antenna system 1302, RF transceiver 204, digital signal processor 208, and protocol controller 1310 may include separate components or instances dedicated to different radio communication technologies and/or unified components that are shared between different radio communication technologies. For example, in some aspects protocol controller 1310 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 1302 may include separate antennas dedicated to different respective radio communication technologies, and/or antennas shared between multiple radio communication technologies. Accordingly, while antenna system 1302, RF transceiver 204, digital signal processor 208, and protocol controller 1310 are shown as individual components in FI, in some aspects antenna system 1302, RF transceiver 204, digital signal processor 208, and/or protocol controller 1310 can encompass separate components dedicated to different radio communication technologies. Accordingly, while antenna system 1302, RF transceiver 204, digital signal processor 208, and controller 1310 are shown as individual components in FIG. 3, in some aspects antenna system 1302, RF transceiver 204, digital signal processor 208, and/or controller 1310 can encompass separate components dedicated to different radio communication technologies.

Figure 14:
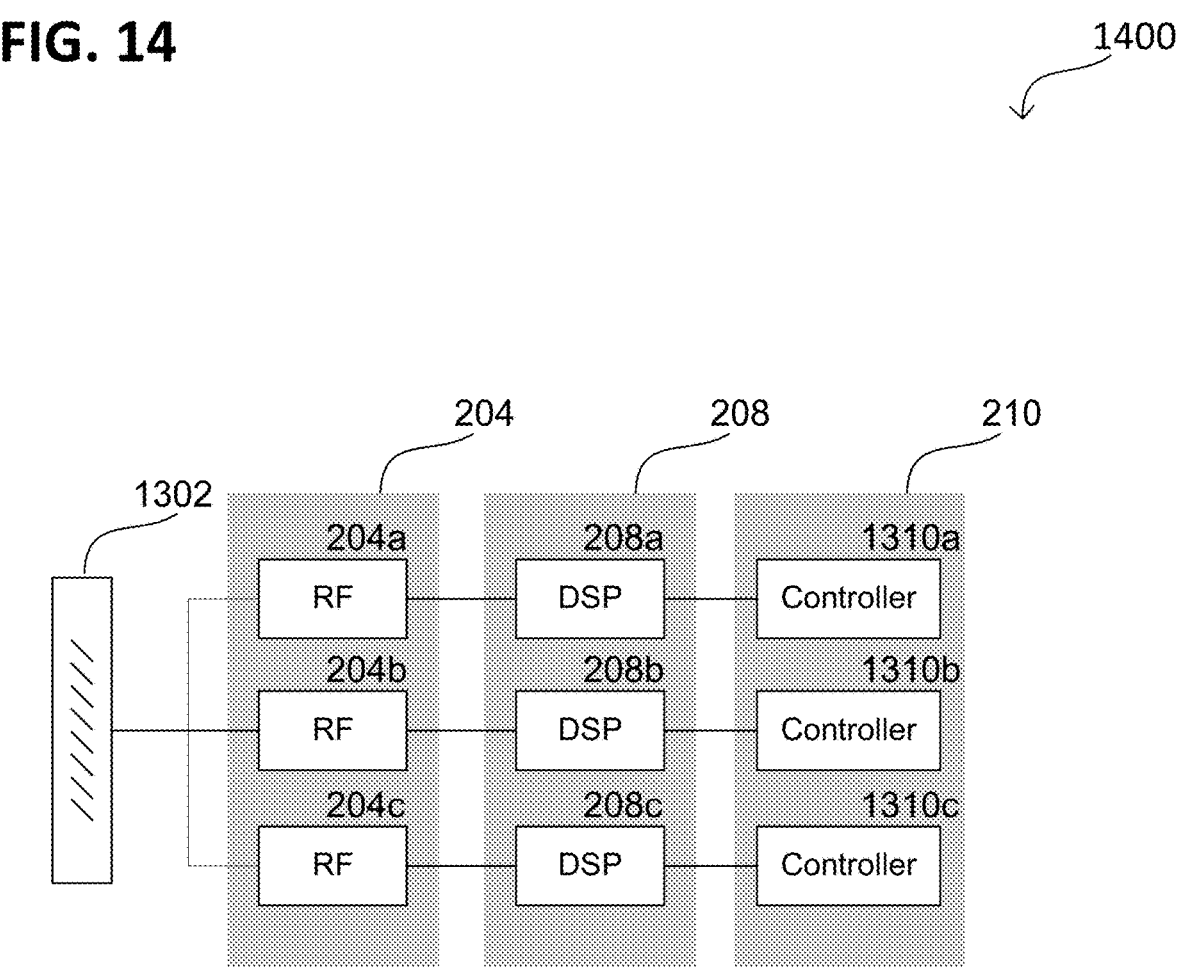
FIG. 14 shows an exemplary device architecture of the client.

FIG. 14 shows an example 1400 in which RF transceiver 204 includes RF transceiver 204a for a first radio communication technology (e.g., for communicating via the first wireless network), RF transceiver 204b for a second radio communication technology (e.g., for communicating via the second wireless network), and optional RF transceiver 204c for a third radio communication technology. Likewise, digital signal processor 208 includes digital signal processor 208a for the first radio communication technology, digital signal processor 208b for the second radio communication technology, and optional digital signal processor 208c for the third radio communication technology. Similarly, controller 1310 may include controller 1310a for the first radio communication technology, controller 1310b for the second radio communication technology, and optional controller 1310c for the third radio communication technology. RF transceiver 204a, digital signal processor 208a, and controller 1310a thus form a communication arrangement (e.g., the hardware and software components dedicated to a particular radio communication technology) for the first radio communication technology (e.g., for communicating via the first wireless network), RF transceiver 204b, digital signal processor 208b, and controller 1310b thus form a communication arrangement for the second radio communication technology (e.g., for communicating via the second wireless network), and RF transceiver 204c, digital signal processor 208c, and controller 1310c thus form a communication arrangement for the third radio communication technology. While depicted as being logically separate in FIG. 4, any components of the communication arrangements may be integrated into a common component.

Terminal device 1202 may also include application processor 1312 and memory 1314. Application processor 1312 may be a CPU, and may be configured to handle the layers above the protocol stack, including the transport and application layers. Application processor 1312 may be configured to execute various applications and/or programs of terminal device 1202 at an application layer of terminal device 1202, such as an operating system (OS), a user interface (UI) for supporting user interaction with terminal device 1202, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 1310 may therefore receive and process outgoing data provided by application processor 1312 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 1302. In the receive path, RF transceiver 204 may receive analog RF signals from antenna system 1302 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 1310, which may process the resulting data according to the layer-specific functions of the protocol stack and provide the resulting incoming data to application processor 1312. Application processor 1312 may then handle the incoming data at the application layer, which can include execution of one or more application programs with the data and/or presentation of the data to a user via a user interface.

Memory 1314 may embody a memory component of terminal device 1202, such as a hard drive or another such permanent memory device. Although not explicitly depicted in FIG. 14, the various other components of terminal device 1202 shown in FIG. 14 may additionally each include integrated permanent and non-permanent memory components, such as for storing software program code, buffering data, etc.

In accordance with some radio communication networks, terminal devices 1202 and 1204 may execute mobility procedures to connect to, disconnect from, and switch between available network access nodes of the radio access network of radio communication network 1200. As each network access node of radio communication network 1200 may have a specific coverage area, terminal devices 1202 and 1204 may be configured to select and re-select between the available network access nodes in order to maintain a strong radio access connection with the radio access network of radio communication network 1200. For example, terminal device 1202 may establish a radio access connection with network access node 110 while terminal device 1204 may establish a radio access connection with network access node 120. In the event that the current radio access connection degrades, terminal devices 1202 or 1204 may seek a new radio access connection with another network access node of radio communication network 1200; for example, terminal device 1204 may move from the coverage area of network access node 112 into the coverage area of network access node 110 (e.g., to maintain coupling to the first wireless network). As a result, the radio access connection with network access node 112 may degrade, which terminal device 1204 may detect via radio measurements such as signal strength or signal quality measurements of network access node 112. Depending on the mobility procedures defined in the appropriate network protocols for radio communication network 1200, terminal device 1204 may seek a new radio access connection (which may be, for example, triggered at terminal device 1204 or by the radio access network), such as by performing radio measurements on neighboring network access nodes to determine whether any neighboring network access nodes can provide a suitable radio access connection. As terminal device 1204 may have moved into the coverage area of network access node 110, terminal device 1204 may identify network access node 110 (which may be selected by terminal device 1204 or selected by the radio access network) and transfer to a new radio access connection with network access node 110 (e.g., as example for the trigger event). Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 15:
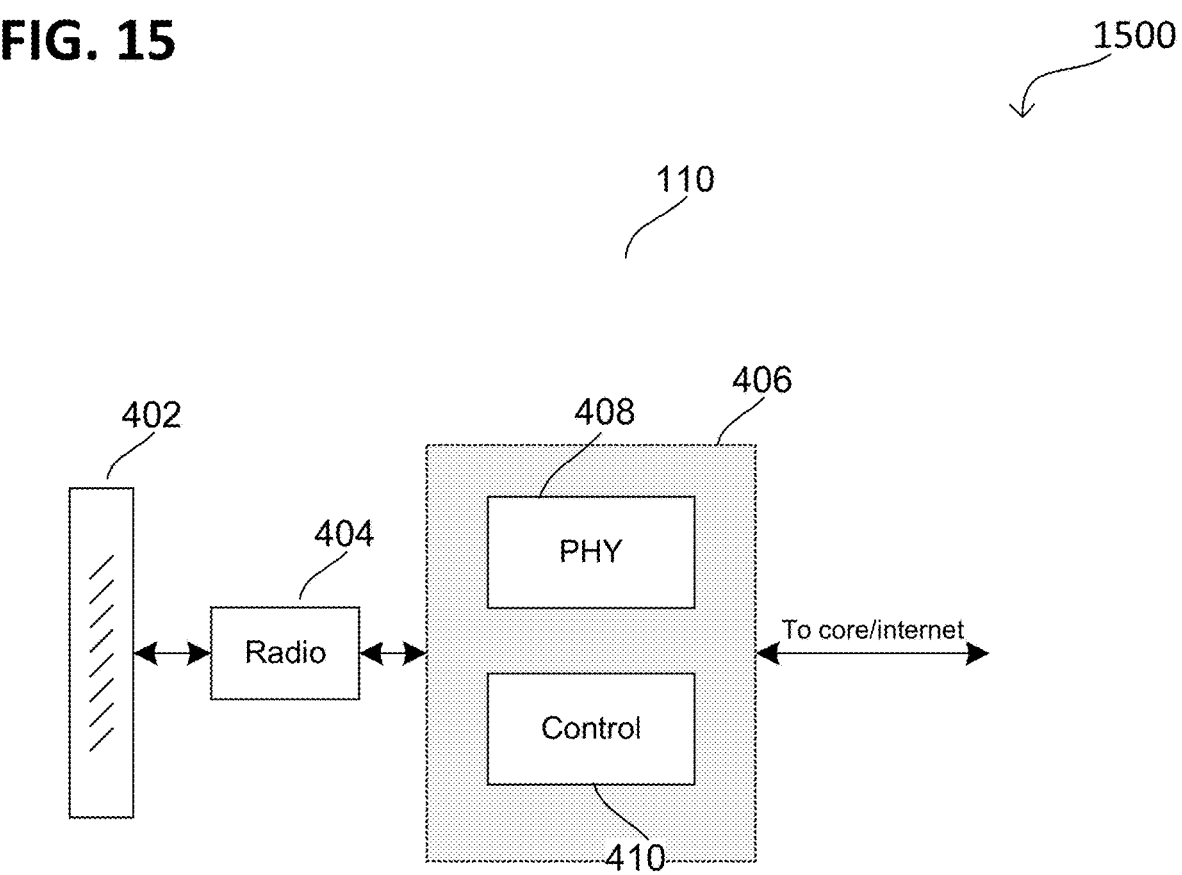
FIG. 15 shows an exemplary internal configuration of a network access node as an example for the network component.

FIG. 15 shows an exemplary internal configuration 1500 of a network access node as example for the network component 100 and/or the AP 202, such as network access node 110, according to some aspects. As shown in FIG. 15, network access node 110 may include antenna system 402, radio transceiver 404, and baseband subsystem 406 (including physical layer processor 408 and protocol controller 410). In an abridged overview of the operation of network access node 110, network access node 110 may transmit and receive wireless signals via antenna system 402, which may be an antenna array including multiple antennas. Radio transceiver 404 may perform transmit and receive RF processing to convert outgoing baseband samples from baseband subsystem 406 into analog radio signals to provide to antenna system 402 for radio transmission and to convert incoming analog radio signals received from antenna system 402 into baseband samples to provide to baseband subsystem 406. Physical layer processor 408 may be configured to perform transmit and receive PHY processing on baseband samples received from radio transceiver 404 to provide to controller 410 and on baseband samples received from controller 410 to provide to radio transceiver 404. Controller 410 may control the communication functionality of network access node 110 according to the corresponding radio communication technology protocols, which may include exercising control over antenna system 402, radio transceiver 404, and physical layer processor 408. Each of radio transceiver 404, physical layer processor 408, and controller 410 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 404 may be a radio transceiver including digital and analog radio frequency processing and amplification circuitry. In some aspects, radio transceiver 404 may be a software-defined radio (SDR) component implemented as a processor configured to execute software-defined instructions that specify radio frequency processing routines. In some aspects, physical layer processor 408 may include a processor and one or more hardware accelerators, wherein the processor is configured to control physical layer processing and offload certain processing tasks to the one or more hardware accelerators. In some aspects, controller 410 may be a controller configured to execute software-defined instructions that specify upper-layer control functions. In some aspects, controller 310 may be limited to radio network protocol stack layer functions, while in other aspects controller 410 may also be configured for transport, internet, and application layer functions.

As example, the components of the baseband subsystem 406 of a network access node may control and carry out the methods described herein.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

In some aspects, the wireless network client (e.g. one or more clients 212a to 212f) may be implemented by a terminal device as detailed herein.

The term "network access node" (also referred as to access node) as utilized herein refers to a network-side device that provides a radio access network with which terminal devices can connect and exchange information with a core network and/or external data networks through the network access node. "Network access nodes" can include any type of base station or access point, including macro base stations, micro base stations, Home base stations, Remote Radio Heads (RRHs), relay points, Wi-Fi/WLAN Access Points (APs), Bluetooth master devices, DSRC RSUs (Road-Side-Unit), terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

In some aspects, the network component 100 may be implemented by a network access node as detailed herein.

In the following, various examples are provided with reference to the aspects described above.

Example 1 is a network component (e.g., for wireless transmission), including: one or more processors configured to: generate a first message to a wireless network client, the first message including a request to report information about wireless networks within communication range of the wireless network client; assign a scheduling group of a plurality of scheduling groups to the wireless network client based on the information; schedule one or more transmissions in accordance with a first wireless network protocol to the wireless network client in accordance with the schedule group assigned to the wireless network client; generate a second message to the wireless network client, the second message including an instruction to schedule one or more transmissions in accordance with a second wireless network protocol from the wireless network client in accordance with the schedule group assigned to the wireless network client.

Example 2 is the network component of example 1, further including: a transceiver configured to provide a communicative coupling in accordance with the first wireless network protocol, e.g., the transceiver configured to transmit (the first message and the second message) in accordance with the first wireless network protocol.

Example 3 is the network component of example 1 or 2, wherein the first message is generated periodically and/or in response to a request to communicatively couple the wireless network client with a network device in accordance with the second wireless network protocol; or a change of a communicative coupling of the wireless network client and the network device in accordance with the second wireless network protocol.

Example 4 is the network component of one of examples 1 to 3, wherein the first wireless network protocol and the second wireless network protocol differ from each other, e.g., in their communicative frequency or frequency range.

Example 5 is the network component of one of examples 1 to 4, wherein the first wireless network protocol is a base-station-network protocol.

Example 6 is the network component of one of examples 1 to 5, wherein the second wireless network protocol is a peer-to-peer network protocol.

Example 7 is the network component of one of examples 1 to 6, wherein the one or more processors are configured to assign the scheduling group further based on a request of reserved capacity and/or on a periodicity for medium access in accordance with the second wireless network protocol.

Example 8 is the network component of one of examples 1 to 7, wherein the one or more processors are further configured to update a result of the assign a scheduling group of the plurality of scheduling groups to the wireless network client in response to determining one or more of the following events: a change in the information about wireless networks within communication range of the wireless network client; a change of a communicative coupling of the wireless network client and a network device in accordance with the second wireless network protocol.

Example 9 is the network component of one of examples 1 to 8, wherein the one or more processors are further configured to update a result of the assign the scheduling group of the plurality of scheduling groups to the wireless network client in response to: a change in the requested resource allocation of the wireless network client and a network device in accordance with the second wireless network protocol.

Example 10 is the network component of one of examples 1 to 9, wherein the information includes one or more of the following: a received channel power indicator; a received signal strength indicator; and/or a received signal to noise indicator.

Example 11 is the network component of one of examples 1 to 10, wherein the second message further includes instructions to configure a transmission rate in accordance with the second wireless network protocol; a modulation and coding scheme in accordance with the second wireless network protocol and/or a transmission power in accordance with the second wireless network protocol.

Example 12 is the network component of one of examples 1 to 11, wherein each scheduling group of the plurality of scheduling groups is assigned to at least one network component.

Example 13 is the network component of example 12, wherein the assigning the scheduling group of the plurality of scheduling groups to the wireless network client is further based on information about wireless networks within communication range of the at least one network component.

Example 14 is the network component of one of examples 1 to 13, wherein the one or more processors are further configured to determine or update an environmental network model based on the information about wireless networks within communication range of the wireless network client, wherein the environmental network model represents a (spatial) usage of radio frequencies in accordance with the second wireless network protocol and/or in the range of transmissions in accordance with the first wireless network protocol.

Example 15 is the network component of example 14, wherein the one or more processors are further configured to determine or update the plurality of scheduling groups based on the environmental network model.

Example 16 is the network component of example 15, wherein the one or more processors are further configured to determine or update a number of the plurality of scheduling groups based on the environmental network model.

Example 17 is the network component of example 15 to 16, wherein the plurality of scheduling groups is determined or updated based on a communicative radio frequency interference of transmissions in accordance with the second wireless network protocol that is determined based on the environmental network model.

Example 18 is the network component of one of examples 1 to 17, wherein the request to report information includes a request for one or more of the following: a beacon report; a channel load report; a request for capacity of access; a request for periodicity of access; and/or a request for a neighbor report.

Example 19 is the network component of one of examples 1 to 18, wherein the instruction indicates: the scheduling group assigned to the wireless network client; and/or a result of the scheduling of the one or more transmissions in accordance with the first wireless network protocol.

Example 20 is the network component of example 19, wherein the result of the scheduling includes a scheme, according to which the one or more transmissions in accordance with a first wireless network protocol are scheduled and/or according to which the one or more transmissions in accordance with a second wireless network protocol are to be scheduled.

Example 21 is a system (e.g., for wireless transmission) including: a network component according to one of examples 1 to 20 and/or a network component including: one or more processors configured to: generate a first message to a wireless network client, the first message including a request to report information about wireless networks within communication range of the wireless network client; assign a scheduling group of a plurality of scheduling groups to the wireless network client based on the information; schedule one or more transmissions in accordance with a first wireless network protocol to the wireless network client in accordance with the schedule group assigned to the wireless network client; generate a second message to the wireless network client, the second message including an instruction to schedule one or more transmissions in accordance with a second wireless network protocol from the wireless network client in accordance with the schedule group assigned to the wireless network client; the wireless network client or a plurality of wireless network client, wherein the network component and the or each wireless network client are configured to communicatively coupled with each other in accordance with the first wireless network protocol.

Example 22 is the system of example 21, wherein the or each wireless network client is communicatively coupled to a network device in accordance with the second wireless network protocol.

Example 23 is a method (e.g., for wireless transmission), including: generating a first message to a wireless network client, the first message including a request to report information about wireless networks within communication range of the wireless network client; assigning a scheduling group of a plurality of scheduling groups to the wireless network client based on the information; scheduling one or more transmissions in accordance with a first wireless network protocol to the wireless network client in accordance with the schedule group assigned to the wireless network client; generating a second message to the wireless network client, the second message including an instruction to schedule one or more transmissions in accordance with a second wireless network protocol from the wireless network client in accordance with the schedule group assigned to the wireless network client; wherein for example, the method is configured according to one of examples 1 to 22.

Example 24 is the method of example 23, wherein the instructions include a scheme, according to which the one or more transmissions in accordance with a second wireless network protocol are to be scheduled.

Example 25 are one or more non-transitory machine-readable (e.g., computer-readable) media storing instructions thereon that, when executed by at least one processor of a network component device, direct the network component to implement the method of example 23 or 24 and/or: generate a first message to a wireless network client, the first message including a request to report information about wireless networks within communication range of the wireless network client; assign a scheduling group of a plurality of scheduling groups to the wireless network client based on the information; scheduling one or more transmissions in accordance with a first wireless network protocol to the wireless network client in accordance with the schedule group assigned to the wireless network client; generate a second message to the wireless network client, the second message including an instruction to schedule one or more transmissions in accordance with a second wireless network protocol from the wireless network client in accordance with the schedule group assigned to the wireless network client.

Example 26 is a network component, including: means for generating a first message to a wireless network client, the first message including a request to report information about wireless networks within communication range of the wireless network client; means for assigning a scheduling group of a plurality of scheduling groups to the wireless network client based on the information; means for scheduling one or more transmissions in accordance with a first wireless network protocol to the wireless network client in accordance with the schedule group assigned to the wireless network client; means for generating a second message to the wireless network client, the second message including an instruction to schedule one or more transmissions in accordance with a second wireless network protocol from the wireless network client in accordance with the schedule group assigned to the wireless network client; wherein for example, the network component further includes means for performing one or more aspects according to one of examples 1 to 25.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A network component, comprising:
one or more processors configured to:
generate a first message for a wireless network client, the first message comprising a request to report information about wireless networks within communication range of the wireless network client;
assign to the wireless network client a scheduling group from a plurality of scheduling groups based on the information;
schedule one or more first transmissions to the wireless network client with a first wireless network protocol and in accordance with the scheduling group assigned to the wireless network client;
generate a second message for the wireless network client, the second message comprising an instruction to schedule one or more second transmissions from the wireless network client with a second wireless network protocol and in accordance with the scheduling group assigned to the wireless network client.

2. The network component of claim 1, further comprising:
a transceiver configured to provide a communicative coupling in accordance with the first wireless network protocol.

3. The network component of claim 1,
wherein the first message is generated periodically and/or in response to
a request to communicatively couple the wireless network client with a network device in accordance with the second wireless network protocol; or
a change of a communicative coupling of the wireless network client and the network device in accordance with the second wireless network protocol.

4. The network component of claim 1,
wherein the first wireless network protocol is a base-station-network protocol.

5. The network component of claim 1,
wherein the second wireless network protocol is a peer-to-peer network protocol.

6. The network component of claim 1,
wherein the one or more processors are configured to assign the scheduling group further based on a request of reserved capacity and/or on a periodicity for medium access in accordance with the second wireless network protocol.

7. The network component of claim 1,
wherein the one or more processors are further configured to update the scheduling group assigned to the wireless network client in response to determining one or more of the following events:
a change in the information about wireless networks within communication range of the wireless network client; and
a change of a communicative coupling of the wireless network client and a network device in accordance with the second wireless network protocol.

8. The network component of claim 1,
wherein the one or more processors are further configured to update the scheduling group assigned to the wireless network client in response to a change in a requested resource allocation, in accordance with the second wireless network protocol, for the wireless network client and a network device.

9. The network component of claim 1, wherein the information comprises one or more of the following:
a received channel power indicator;
a received signal strength indicator; and/or
a received signal to noise indicator.

10. The network component of claim 1, wherein the second message further comprises instructions to configure
a transmission rate in accordance with the second wireless network protocol;
a modulation and coding scheme in accordance with the second wireless network protocol; and/or
a transmission power in accordance with the second wireless network protocol.

11. The network component of claim 1, wherein the one or more processors are further configured to determine or update an environmental network model based on the information about wireless networks within communication range of the wireless network client, wherein the environmental network model represents a usage of radio frequencies in accordance with the second wireless network protocol and/or in a range of transmissions in accordance with the first wireless network protocol.

12. The network component of claim 11, wherein the one or more processors are further configured to determine or update the plurality of scheduling groups based on the environmental network model.

13. The network component of claim 12, wherein the one or more processors are further configured to determine or update a number of the plurality of scheduling groups based on the environmental network model.

14. The network component of claim 12, wherein the plurality of scheduling groups is determined or updated based on a communicative radio frequency interference of transmissions in accordance with the second wireless network protocol that is determined based on the environmental network model.

15. The network component of claim 1, wherein the request to report information comprises:
a request for a beacon report;
a request for a channel load report;

a request for a request for capacity of access;
a request for periodicity of access; and/or
a request for a neighbor report.

16. The network component of claim 1, wherein the instruction indicates
the scheduling group assigned to the wireless network client; and/or
a result of the scheduling of the one or more first transmissions.

17. The network component of claim 16, wherein the result of the scheduling comprises a scheme, according to which the one or more first transmissions are scheduled.

18. A method, comprising:
generating a first message for a wireless network client, the first message comprising a request to report information about wireless networks within communication range of the wireless network client;
assigning to the wireless network client a scheduling group from a plurality of scheduling groups based on the information;
scheduling one or more first transmissions with a first wireless network protocol and in accordance with the scheduling group assigned to the wireless network client, wherein the one or more first transmissions are to the wireless network client;
generating a second message for the wireless network client, the second message comprising an instruction to schedule one or more second transmissions with a second wireless network protocol in accordance with the scheduling group assigned to the wireless network client, wherein the one or more second transmissions are from the network client.

19. The method of claim 18,
wherein the information comprises one or more of the following:
a received channel power indicator;
a received signal strength indicator; and/or
a received signal to noise indicator.

20. One or more non-transitory machine-readable media storing instructions thereon that, when executed by at least one processor of a network component, direct the network component to:
generate a first message for a wireless network client, the first message comprising a request to report information about wireless networks within communication range of the wireless network client;
assign a scheduling group of a plurality of scheduling groups to the wireless network client based on the information;
scheduling one or more first transmissions with a first wireless network protocol and in accordance with the scheduling group assigned to the wireless network client, wherein the one or more first transmissions are to the wireless network client;
generate a second message to the wireless network client, the second message comprising an instruction to schedule one or more second transmissions with a second wireless network protocol and in accordance with the scheduling group assigned to the wireless network client, wherein the one or more second transmissions are from the wireless network client.

* * * * *